US011127335B2

(12) United States Patent
Ahn et al.

(10) Patent No.: US 11,127,335 B2
(45) Date of Patent: Sep. 21, 2021

(54) DRIVING CONTROLLER FOR DISPLAYING IMAGE USING DITHER PATTERNS AND DISPLAY DEVICE HAVING THE SAME

(71) Applicant: Samsung Display Co., Ltd., Yongin-Si (KR)

(72) Inventors: Kuk-Hwan Ahn, Uiwang-si (KR); HongSoo Kim, Hwaseong-si (KR); Junheyung Jung, Yongin-si (KR); Youngwook Yoo, Suwon-si (KR); Jungyu Lee, Seoul (KR); Hyunjun Lim, Suwon-si (KR); Byung Ki Chun, Seoul (KR)

(73) Assignee: Samsung Display Co., Ltd.

( * ) Notice: Subject to any disclaimer, the term of this patent is extended or adjusted under 35 U.S.C. 154(b) by 0 days.

(21) Appl. No.: 16/893,326

(22) Filed: Jun. 4, 2020

(65) Prior Publication Data

US 2021/0118354 A1 Apr. 22, 2021

(30) Foreign Application Priority Data

Oct. 21, 2019 (KR) .................. 10-2019-0130766

(51) Int. Cl.
*G09G 3/20* (2006.01)
*G09G 5/18* (2006.01)
*G06T 1/20* (2006.01)

(52) U.S. Cl.
CPC ............ *G09G 3/2055* (2013.01); *G06T 1/20* (2013.01); *G09G 3/2044* (2013.01); *G09G 3/2074* (2013.01); *G09G 3/2077* (2013.01); *G09G 5/18* (2013.01); *G09G 2340/0435* (2013.01)

(58) Field of Classification Search
None
See application file for complete search history.

(56) References Cited

U.S. PATENT DOCUMENTS

| 5,920,305 | A  | * | 7/1999 | Yoon ................... G09G 3/2092 |
|           |    |   |        | 345/600 |
| 6,219,838 | B1 | * | 4/2001 | Cherichetti .............. G06F 3/14 |
|           |    |   |        | 348/453 |
| 9,349,160 | B1 | * | 5/2016 | Bastani ................... G06T 5/002 |
| 9,984,623 | B2 |   | 5/2018 | An et al. |

(Continued)

FOREIGN PATENT DOCUMENTS

| CN | 105096796 A | 11/2015 |
| JP | 2008294899 A | 12/2008 |

(Continued)

OTHER PUBLICATIONS

European Communication corresponding to European Patent Application No. 202021283 dated Mar. 26, 2021 11 pages.

*Primary Examiner* — Joni Hsu
(74) *Attorney, Agent, or Firm* — Innovation Counsel LLP

(57) ABSTRACT

A driving controller of a display device includes a driving frequency controller for receiving an image signal, determining a driving frequency based on the image signal, and outputting a masking enable signal corresponding to the driving frequency, and an image processor for converting the image signal into a data signal and outputting the data signal, wherein the image processor sequentially converts, based on the masking enable signal being at an active level, a part of bits of the image signal into the data signal corresponding to a plurality of dither patterns.

21 Claims, 21 Drawing Sheets

(56) References Cited

U.S. PATENT DOCUMENTS

| | | | |
|---|---|---|---|
| 2006/0181494 A1* | 8/2006 | Morita | G09G 3/3696 345/89 |
| 2008/0111925 A1* | 5/2008 | Kato | G09G 3/3688 348/721 |
| 2009/0122054 A1 | 5/2009 | Lee et al. | |
| 2011/0019092 A1* | 1/2011 | Bridges | H03L 7/093 348/548 |
| 2011/0205250 A1* | 8/2011 | Yoo | G09G 3/3233 345/690 |
| 2012/0236021 A1* | 9/2012 | Parmar | G09G 3/3466 345/597 |
| 2014/0111564 A1 | 4/2014 | Jeon et al. | |
| 2015/0340014 A1* | 11/2015 | Kim | G09G 5/18 345/212 |
| 2015/0371609 A1 | 12/2015 | Choi et al. | |

FOREIGN PATENT DOCUMENTS

| | | |
|---|---|---|
| KR | 10-2015-0092420 A | 8/2015 |
| KR | 10-2015-0134485 A | 12/2015 |
| KR | 10-2017-0036934 A | 4/2017 |
| KR | 10-1954934 B1 | 3/2019 |

\* cited by examiner

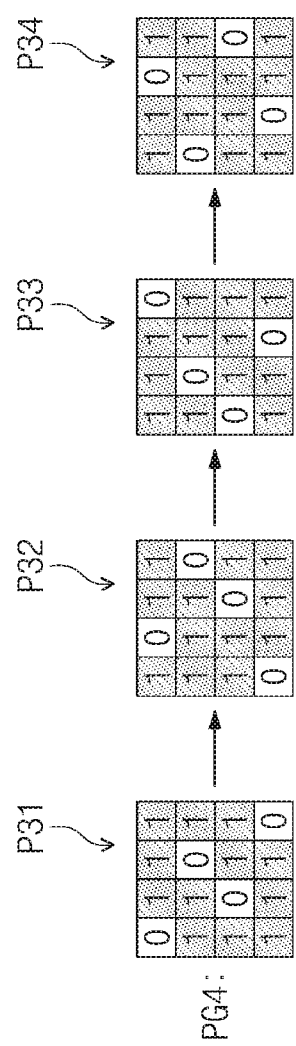

DRIVING CONTROLLER FOR DISPLAYING IMAGE USING DITHER PATTERNS AND DISPLAY DEVICE HAVING THE SAME

CROSS-REFERENCE TO RELATED APPLICATION

This U.S. non-provisional patent application claims priority under 35 U.S.C. § 119 of Korean Patent Application No. 10-2019-0130766, filed on Oct. 21, 2019, the disclosure of which is hereby incorporated by reference in its entirety.

BACKGROUND

The present disclosure herein relates to a display device, and more particularly, to a display device having a driving controller.

A variety of display devices are being developed for various applications and use in electronic devices such as a television, a mobile phone, a tablet computer, a navigation device, and a game device. In particular, because portable electronic devices are powered by batteries, various efforts are underway to reduce power consumption.

One of the efforts to reduce power consumption is to lower an operating frequency of a display device. For example, when the display device displays a still image, power consumption of the display device may be reduced by lowering the operating frequency of the display device.

In addition, technologies are required that can reduce power consumption of a display device while providing a display quality adequate for the intended use of the display device.

SUMMARY

The present disclosure provides a driving controller capable of reducing power consumption of a display device but preventing quality degradation of a displayed image, and a display device having the same.

An embodiment of the inventive concept provides a driving controller including: a driving frequency controller configured to receive an image signal, determine a driving frequency based on the image signal, and output a masking enable signal corresponding to the driving frequency; and an image processor configured to convert the image signal into a data signal and output the data signal. The image processor may sequentially convert, based on the masking enable signal being at an active level, a part of bits of the image signal into the data signal corresponding to a plurality of dither patterns.

In an embodiment, the image processor may convert the image signal into the data signal in synchronization with an input synchronization signal based on the masking enable signal being at the active level, and the image processor may hold converting the image signal into the data signal based on the masking enable signal being at an inactive level.

In an embodiment, the image processor may select the plurality of dither patterns of a predetermined order based on the masking enable signal being at the active level, and convert some bits of the image signal into the data signal by using the plurality of dither patterns, wherein the image processor holds selection of the plurality of dither patterns based on the masking enable signal being at an inactive level.

In an embodiment, the driving controller may further include a control signal generator configured to receive an input synchronization signal, and output an output synchronization signal corresponding to the driving frequency.

In an embodiment, the image processor may include: a dithering part configured to output image data by sequentially changing a part of bits of the image signal to the plurality of dither patterns in synchronization with the input synchronization signal; and an output part configured to output the image data as the data signal in synchronization with the output synchronization signal.

In an embodiment, the masking enable signal may be maintained at the active level based on a frequency of the input synchronization signal matching the driving frequency.

In an embodiment, a frequency of the masking enable signal may correspond to the driving frequency based on the driving frequency mismatching the frequency of the input synchronization signal.

In an embodiment, the image processor may include: a gamma correction part configured to correct a gradation level of the image signal in synchronization with the input synchronization signal and output the image signal having a corrected gradation level; a dithering part configured to output image data by sequentially changing the part of bits of the image signal to the plurality of dither patterns; and an output part configured to output the image data as the data signal in synchronization with the output synchronization signal.

In an embodiment, the image processor may include: a spot correction part configured to output image data by sequentially changing the part of bits of the image signal to a plurality of spot correction patterns in synchronization with the input synchronization signal; and an output part configured to output the image data as the data signal in synchronization with the output synchronization signal.

In an embodiment, the driving frequency controller may include: a still image determination part configured to determine whether the image signal is a still image; a flicker determination part configured to determine a flicker index of the image signal based on determination by the still image determination part that the image signal is the still image; and a frequency determination part configured to determine the driving frequency based on the flicker index.

In an embodiment, the frequency determination part may determine the driving frequency to be lower than a frequency of the input synchronization signal based on the image signal being the still image and the flicker index of the image signal being smaller than or equal to a predetermined value.

In an embodiment of the inventive concept, a display device includes: a display panel including a plurality of pixels respectively connected to a plurality of data lines and a plurality of scan lines; a data driving circuit configured to drive the plurality of data lines; a scan driving circuit configured to drive the plurality of scan lines; and a driving controller configured to receive an input synchronization signal and an image signal, and control the data driving circuit and the scan driving circuit. The driving controller may include: a driving frequency controller configured to determine a driving frequency of the display panel based on the image signal and output a masking enable signal corresponding to the driving frequency; and an image processor configured to convert the image signal into a data signal and output the data signal. The image processor may sequentially convert, based on the masking enable signal being at an active level, the part of bits of the image signal into the data signal corresponding to a plurality of dither patterns.

In an embodiment, the image processor may convert, in synchronization with the input synchronization signal based on the masking enable signal being at the active level, the part of bits of the image signal into the data signal corresponding to the plurality of dither patterns of a predetermined order.

In an embodiment, the driving controller may further include a control signal generator configured to receive the input synchronization signal and output an output synchronization signal corresponding to the driving frequency.

In an embodiment, the image processor may include: a dithering part configured to output image data by sequentially changing the part of bits of the image signal to the plurality of dither patterns in synchronization with the input synchronization signal; and an output part configured to output the image data as the data signal in synchronization with the output synchronization signal.

In an embodiment, the masking enable signal may periodically transition between the active level and an inactive level based on the driving frequency being lower than a frequency of the input synchronization signal, and a frequency of the masking enable signal may correspond to the driving frequency.

In an embodiment, the image processor may include: a spot correction part configured to output image data by sequentially changing the part of bits of the image signal to a plurality of spot correction patterns in synchronization with the input synchronization signal; and an output part configured to output the image data as the data signal in synchronization with the output synchronization signal.

In an embodiment, the display panel may include a first display region and a second display region, the driving frequency controller may determine, based on the image signal, a first driving frequency corresponding to the first display region and a second driving frequency corresponding to the second display region, and output a first masking enable signal corresponding to the first driving frequency and a second masking enable signal corresponding to the second driving frequency, and the image processor may sequentially convert a first part of bits of a first image signal corresponding to the first display region of the image signal into a first data signal corresponding to a first plurality of dither patterns in synchronization with the input synchronization signal based on the first masking enable signal being at the active level, sequentially convert a second part of bits of a second image signal corresponding to the second display region of the image signal into a second data signal corresponding to a second plurality of dither patterns in synchronization with the input synchronization signal based on the second masking enable signal being at the active level, and output the first data signal and the second data signal as the data signal.

In an embodiment, the first driving frequency may be the same as the frequency of the input synchronization signal, and the second driving frequency may be lower than a frequency of the input synchronization signal.

In an embodiment, the image processor may convert, in synchronization with the input synchronization signal based on the first masking enable signal being at the active level, the first part of bits of the first image signal into the first data signal corresponding to the first plurality of dither patterns of a first predetermined order.

In an embodiment, the image processor may convert, in synchronization with the input synchronization signal based on the second masking enable signal being at the active level, the second part of bits of the second image signal into the second data signal corresponding to the second plurality of dither patterns of a second predetermined order, and the image processor may hold converting the second image signal into the second data signal based on the second masking enable signal being at an inactive level.

In an embodiment, the image processor may convert the second image signal into the second data signal corresponding to the second plurality of dither signals of a second predetermined order based on the second masking enable signal being at an inactive level.

BRIEF DESCRIPTION OF THE FIGURES

The accompanying drawings are included to provide a further understanding of the inventive concept, and are incorporated in and constitute a part of the present disclosure. The drawings illustrate embodiments of the inventive concept and, together with the detailed description, serve to describe principles of the inventive concept. In the drawings:

FIGS. 7A, 7B, 7C, and 7D illustrate an exemplary operation of a dithering part illustrated in FIG. 6;

DETAILED DESCRIPTION

Figure 1:
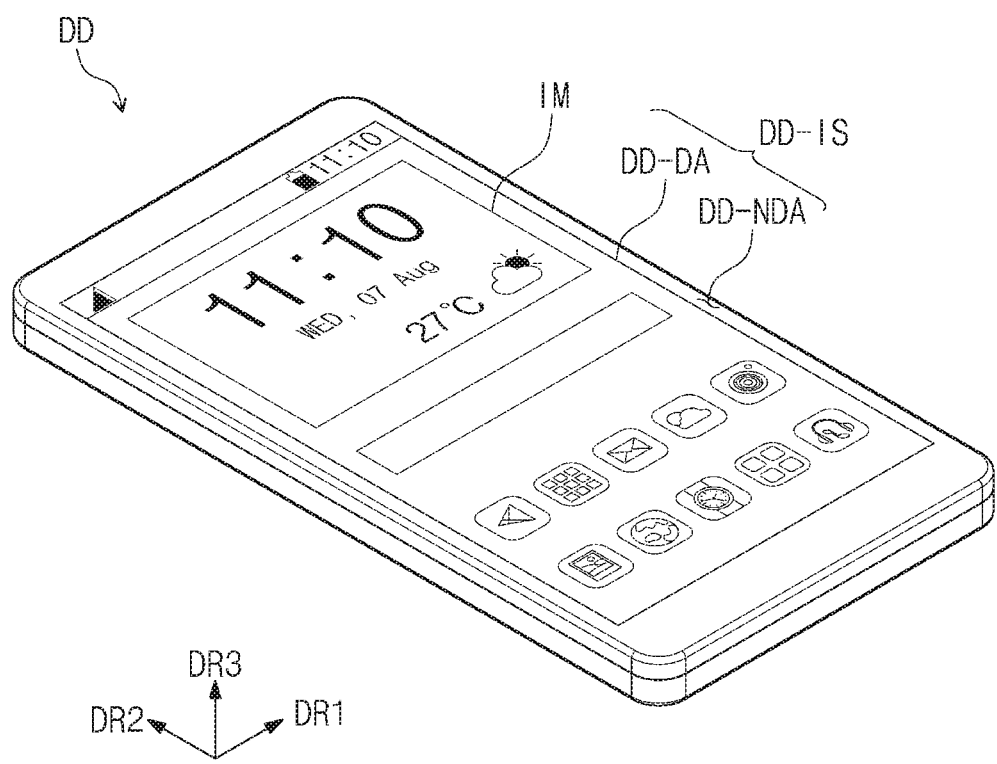
FIG. 1 is a perspective view of a display device according to an embodiment of the inventive concept.

It will be understood that when an element or layer is referred to as being "on," "connected to" or "coupled to" another element or layer, it can be directly on, connected or coupled to the other element or layer, or one or more intervening elements or layers may be present.

Like reference numerals refer to like elements throughout the present disclosure. In the figures, the thicknesses, ratios, and dimensions of elements are exaggerated for effective and convenient description of the technical aspects of the inventive concept. As used herein, the term "and/or" includes any and all combinations of one or more of the associated listed items.

It will be understood that, although the terms first, second, etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present disclosure. As used herein, the singular forms, "a," "an," and "the" are intended to include the plural forms as well, unless the context clearly indicates otherwise.

It will be further understood that the terms "include" or "have," when used in the present disclosure, specify the presence of stated features, integers, steps, operations, elements, and/or components, but do not preclude the presence or addition of one or more other features, integers, steps, operations, elements, components, and/or groups thereof.

As used herein, the term "part" refers to a software component, a hardware component, or any combination thereof that performs a specific function. A hardware component may include, for example, a field-programmable gate array (FPGA) or an application-specific integrated circuit (ASIC). A software component may refer to an executable code, and/or data used by the executable code in an addressable storage medium. Thus, software components may be, for example, object-oriented software components, class components, and/or task components, and may include processes, functions, attributes, procedures, subroutines, program code segments, drivers, firmware, microcode, circuits, data, databases, data structures, tables, arrays, or variables.

Unless otherwise defined, terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present disclosure will be explained in detail with reference to the accompanying drawings.

FIG. 1 is a perspective view of a display device according to an embodiment of the inventive concept.

In FIG. 1, a portable terminal is illustrated as an example of a display device DD according to an embodiment of the inventive concept. A portable terminal may include a tablet PC, a smartphone, a personal digital assistant (PDA), a portable multimedia player (PMP), a game device, a wristwatch type electronic device, or the like. However, the inventive concept is not limited thereto.

According to an embodiment of the inventive concept, the display device DD may be a large-sized electronic device such as a television and an outdoor digital signage, or a small- and medium-sized electronic device such as a personal computer, a laptop computer, a car navigation device, and a camera. These are merely exemplary embodiments, and an embodiment of the inventive concept may also be employed in other electronic devices without departing from the inventive concept.

As illustrated in FIG. 1, the display device DD may display an image IM toward a third direction DR3 on a display surface DD-IS that is parallel to each of a first direction DR1 and a second direction DR2. The display surface DD-IS on which the image IM is displayed may correspond to a front surface of the display device DD. The display device DD includes a plurality of regions that are divided on the display surface DD-IS. The display surface DD-IS includes a display region DD-DA in which the image IM is displayed, and a non-display region DD-NDA adjacent to the display region DD-DA. The non-display region DD-NDA may be referred to as a bezel region. As an example, the display region DD-DA may have a quadrangular shape. The non-display region DD-NDA surrounds the display region DD-DA. However, this is illustrated by way of example, and the non-display region DD-NDA may be disposed adjacent to one or more sides of the display region DD-DA or be omitted. In addition, although not illustrated, the display device DD may have a partially curved shape, and the display region DD-DA may have a curved shape. For example, the display region DD-DA may be partially bent to display an image not only in the third direction DR3 but also in the first direction DR1 and/or the second direction DR2.

A front surface (or a top surface, or a first surface) and a rear surface (or a bottom surface, or a second surface) of each of members may be defined in relation to a direction (e.g., the third direction DR3) in which the image IM is displayed. However, directions indicated by the first to third directions DR1 to DR3 are relative, and may be changed to different directions. Hereinafter, first to third directions are directions respectively indicated by the first to third directions DR1 to DR3, and refer to the same reference numerals.

Figure 2:
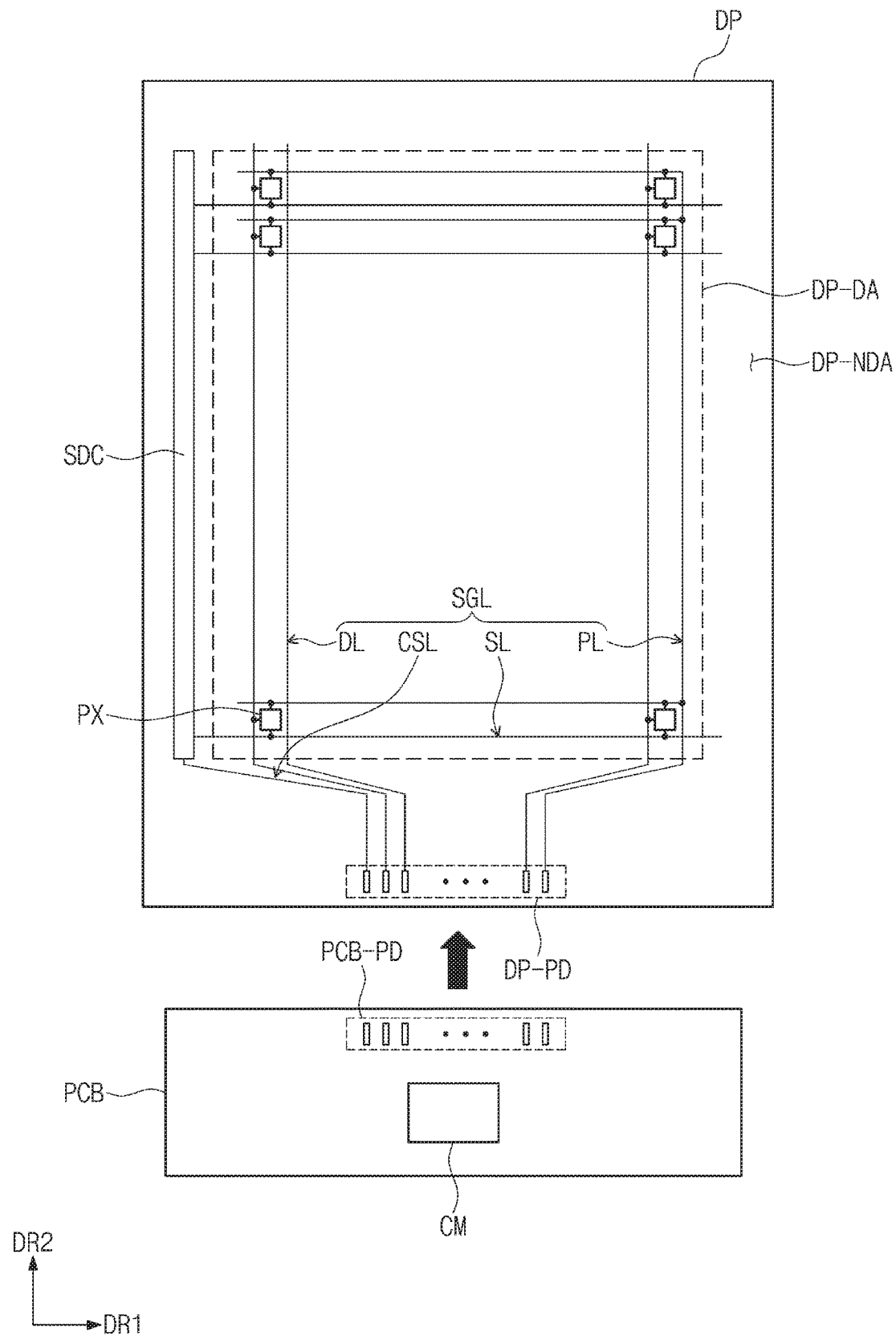
FIG. 2 is a plan view of a display part according to an embodiment of the inventive concept.

FIG. 2 is a plan view of a display part according to an embodiment of the inventive concept. FIG. 2 schematically illustrates a signal circuit diagram. In addition, some components are omitted in FIG. 2 for ease of description.

As illustrated in FIG. 2, a display panel DP includes a display region DP-DA and a non-display region DP-NDA when viewed in a plane. In the present embodiment, the non-display region DP-NDA may be defined along an edge of the display region DP-DA. The display region DP-DA and the non-display region DP-NDA of the display panel DP may respectively correspond to the display region DD-DA and the non-display region DD-NDA of the display device DD illustrated in FIG. 1.

The display panel DP may include a scan driving circuit SDC, a plurality of signal lines SGL (hereinafter referred to as signal lines SGL), a plurality of signal pads DP-PD (hereinafter referred to as signal pads DP-PD), and a plurality of pixels PX (hereinafter referred to as pixels PX). The pixels PX are arranged in the display region DP-DA. Each of the pixels PX may include an organic light emitting diode and a pixel driving circuit connected thereto. In the following description, the display panel DP is described as an organic light emitting display panel including an organic light emitting diode, but the inventive concept is not limited thereto. For example, the display panel DP may be one of a liquid crystal display (LCD) panel, a plasma display panel (PDP), and a field emission display (FED) panel.

The scan driving circuit SDC generates a plurality of scan signals (hereinafter referred to as scan signals), and sequentially outputs the scan signals to a plurality of scan lines SL (hereinafter referred to as scan lines SL). The scan driving circuit SDC may further output one or more control signals to the pixel driving circuit of each of the pixels PX.

The scan driving circuit SDC may include a plurality of thin film transistors formed through a process the same as that of the pixel driving circuit of each of the pixels PX, for example, a low temperature polycrystalline silicon (LTPS) process and/or a low temperature polycrystalline oxide (LTPO) process.

The signal lines SGL include the scan lines SL, a plurality of data lines DL (hereinafter referred to as data lines DL), a power line PL, and a control signal line CSL. The scan lines SL are respectively connected to the corresponding pixels PX, and the data lines DL are respectively connected to the corresponding pixels PX of the pixels PX. The power line PL is connected to the pixels PX. The control signal line CSL may provide control signals to the scan driving circuit SDC.

The signal lines SGL overlap the display region DP-DA and the non-display region DP-NDA. The signal lines SGL may include a pad part and a line part. The line part may overlap the display region DP-DA and the non-display region DP-NDA. The pad part is connected to an end of the line part. In the present example shown in FIG. 2, the signal lines SGL may include a plurality of pad parts and a plurality of line parts. Each of the pad parts may be disposed in the non-display region DP-NDA and overlap a corresponding signal pad among the signal pads DP-PD.

The line parts connected to the pixels PX substantially correspond to most of the signal lines SGL. The line part is connected to one or more transistors (not illustrated) of the pixel PX. The line part may have a single layer structure or a multilayer structure, and may have a single body or may include two or more portions. The two or more portions of the line part may be disposed on different layers and may be connected to each other through a contact hole that penetrates through an insulating layer disposed between the two or more portions.

FIG. 2 additionally illustrates a circuit board PCB that is electrically connected to the display panel DP. The circuit board PCB may be a rigid circuit board or a flexible circuit board. The circuit board PCB may be directly coupled to the display panel DP, or electrically connected to the display panel DP through another circuit board.

A control module CM for controlling the operation of the display panel DP may be disposed on the circuit board PCB. The control module CM may be mounted on the circuit board PCB in the form of an integrated circuit (IC) chip. The circuit board PCB may include circuit board pads PCB-PD that are electrically connected to the display panel DP. Although not illustrated, signal lines connecting the circuit board pads PCB-PD to the control module CM may be included in the circuit board PCB.

Figure 3:
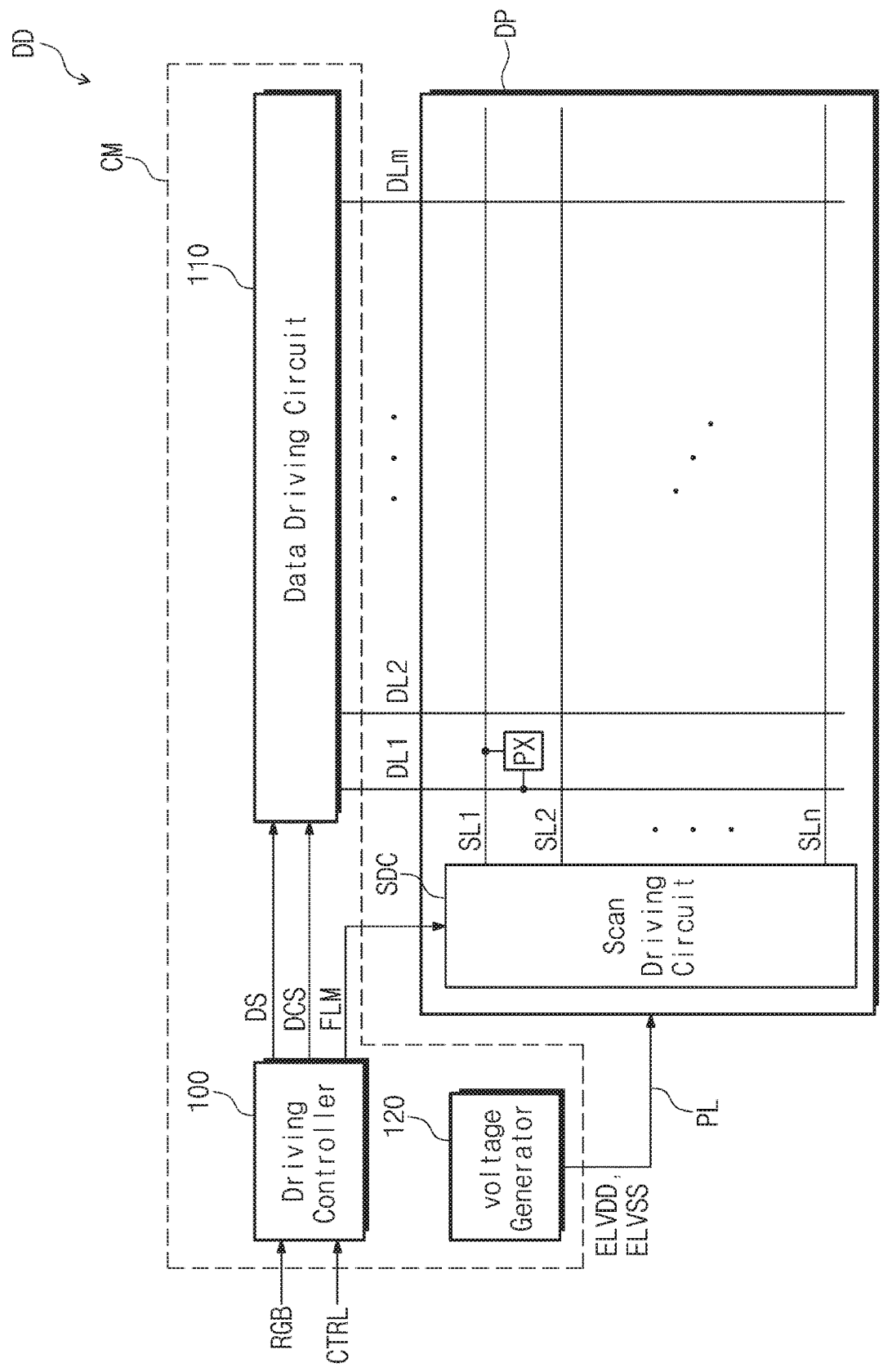
FIG. 3 is a block diagram of the display device according to the embodiment of the inventive concept.

FIG. 3 is a block diagram of the display device DD according to the embodiment of the inventive concept.

The display device DD includes the display panel DP and the control module CM. The display panel DP includes the scan driving circuit SDC, the plurality of pixels PX, a plurality of data lines DL1 to DLm, and a plurality of scan lines SL1 to SLn. Each of the plurality of pixels PX is connected to a corresponding data line among the plurality of data lines DL1 to DLm and a corresponding scan line among the plurality of scan lines SL1 to SLn.

The control module CM includes a driving controller 100, a data driving circuit 110, and a voltage generator 120.

The driving controller 100 receives, from the outside, an image signal RGB and a control signal CTRL for controlling the display panel DP. For example, the control signal CTRL may include an input synchronization signal I_VSYNC and an input data enable signal I_DE. In addition, the control signal CTRL may further include a horizontal synchronization signal, a main clock signal, or the like. The driving controller 100 provides the data driving circuit 110 with a data signal DS that is obtained by processing the image signal RGB according to the operating conditions of the display panel DP. Based on the control signal CTRL, the driving controller 100 provides a first control signal DCS to the data driving circuit 110, and a second control signal FLM to the scan driving circuit SDC. The first control signal DCS may include a horizontal synchronization start signal, a clock signal, and a line latch signal, and the second control signal FLM may include a vertical synchronization start signal and an output enable signal. Although not illustrated, the driving controller 100 may provide control signals to the voltage generator 120 for controlling the operation of the voltage generator 120.

The data driving circuit 110 may output gradation voltages for driving the plurality of data lines DL1 to DLm in response to the first control signal DCS and the data signal DS that are received from the driving controller 100.

The scan driving circuit SDC drives the plurality of scan lines SL1 to SLn in response to the second control signal FLM that is from the driving controller 100. In an embodiment, the scan driving circuit SDC may be formed on the display panel DP by the same process as the pixel driving circuit of the pixels PX, but the present disclosure is not limited thereto. For example, the scan driving circuit SDC may be implemented as an integrated circuit (IC) to be mounted directly on a predetermined region of the display panel DP, or may be mounted on a separate printed circuit board by a chip on film (COF) process and electrically connected to the display panel DP.

The voltage generator 120 may provide, through the power line PL, the display panel DP with voltages for operating the display panel DP, for example, a first voltage ELVDD and a second voltage ELVSS. In addition, the voltage generator 120 may further generate voltages for operating the driving controller 100 and the data driving circuit 110.

Figure 4:
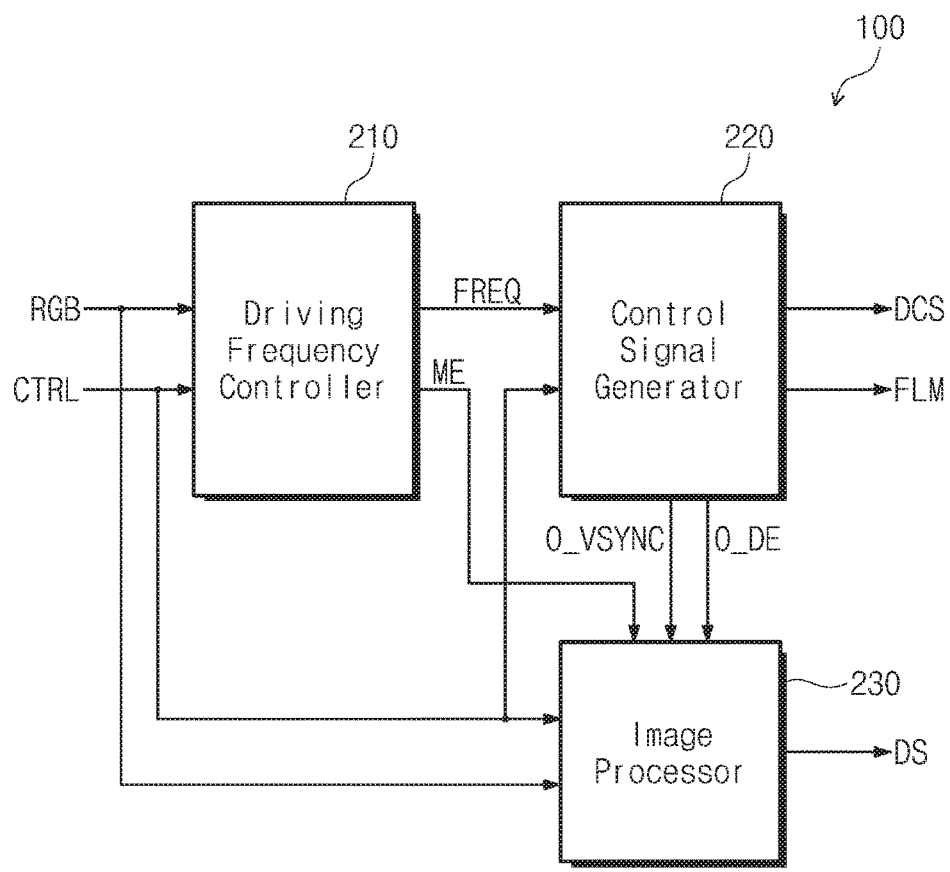
FIG. 4 is a block diagram of a driving controller according to an embodiment of the inventive concept.

FIG. 4 is a block diagram of the driving controller 100 according to an embodiment of the inventive concept.

As illustrated in FIG. 4, the driving controller 100 includes a driving frequency controller 210, a control signal generator 220, and an image processor 230.

The driving frequency controller 210 receives the image signal RGB and the control signal CTRL from the outside. The control signal CTRL may include the input synchronization signal. The driving frequency controller 210 determines a driving frequency of the display panel DP based on the image signal RGB, and outputs a driving frequency signal FREQ corresponding to the determined driving frequency. In addition, the driving frequency controller 210 outputs a masking enable signal ME corresponding to the determined driving frequency.

The control signal generator 220 outputs the first control signal DCS, the second control signal FLM, an output synchronization signal O_VSYNC, and an output data enable signal O_DE in response to the control signal CTRL and the driving frequency signal FREQ. The output synchronization signal O_VSYNC and the output data enable signal O_DE may be included in the first control signal DCS and/or the second control signal FLM. As described above with reference to FIG. 3, the first control signal DCS is provided to the data driving circuit 110, and the second control signal FLM is provided to the scan driving circuit SDC.

The image processor 230 receives the image signal RGB, the control signal CTRL, the masking enable signal ME, the output synchronization signal O_VSYNC, and the output data enable signal O_DE. The output synchronization signal O_VSYNC and the output data enable signal O_DE may be collectively referred to as an output synchronization signal.

The image processor 230 converts the image signal RGB into the data signal DS in synchronization with the control signal CTRL and the masking enable signal ME, and outputs the data signal DS to the data driving circuit 110 in synchronization with the output synchronization signal. In addition, the image processor 230 may sequentially convert a part of bits of the image signal RGB into the data signal DS corresponding to a plurality of dither patterns, in synchronization with the control signal CTRL, for example, when the masking enable signal ME is at an active level (e.g., a low level).

More specifically, the image processor 230 may convert the image signal RGB into the data signal DS in synchronization with the control signal CTRL when the masking enable signal ME is at the active level, and may hold the operation of converting the image signal RGB into the data signal DS when the masking enable signal ME is at an inactive level (e.g., a high level).

Figure 5:
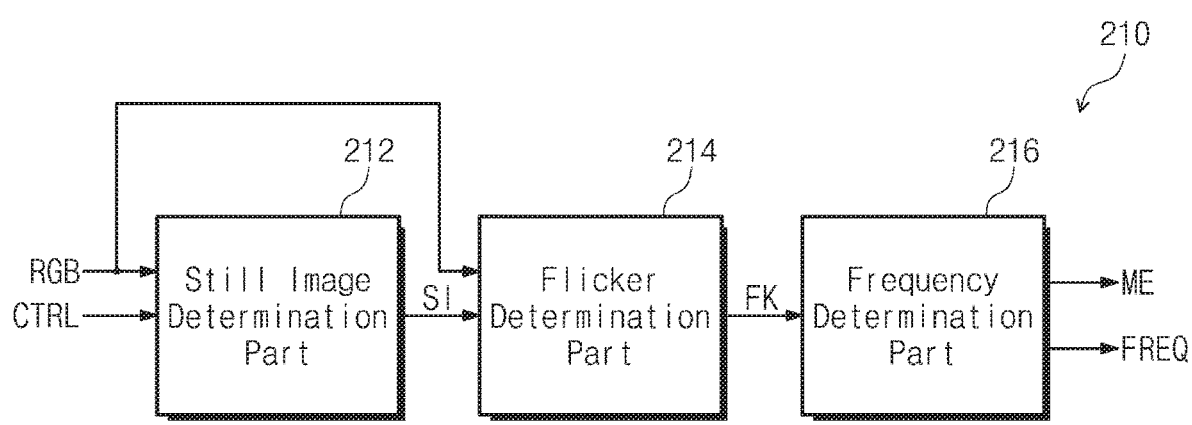
FIG. 5 is a block diagram according to an embodiment of a driving frequency controller illustrated in FIG. 4.

FIG. 5 is a block diagram according to an embodiment of the driving frequency controller 210 illustrated in FIG. 4.

The driving frequency controller 210 includes a still image determination part 212, a flicker determination part 214, and a frequency determination part 216.

The still image determination part 212 determines whether the image signal RGB is a still image or a moving image, and outputs a still image flag signal SI. The still image determination part 212 compares an image signal (hereinafter denoted by RGBk−1) of a previous frame with an image signal (hereinafter denoted by RGBk) of a current frame and determines whether the image signal RGBk of the current frame is a still image when a difference therebetween is less than or equal to a predetermined value. In another embodiment, the still image determination part 212 may determine whether the image signal RGBk of the current frame is a still image by comparing the image signal RGBk−1 of the previous frame corresponding to a predetermined region of the display panel DP and the image signal RGBk of the current frame corresponding to the same predetermined region of the display panel DP. When the image signal RGBk of the current frame is determined to be a still image, the still image determination part 212 outputs the still image flag signal SI at a first level (e.g., a high level).

The still image determination part 212 may include a memory for storing the entirety of or at least a portion of the image signal RGBk−1 of the previous frame to compare with the image signal RGBk of the current frame.

The flicker determination part 214 determines a flicker index FK of the image signal RGB when the image signal RGB is determined to be a still image, for example, when the still image flag signal SI is at the first level.

The frequency determination part 216 may determine the driving frequency depending on the flicker index FK that is received from the flicker determination part 214. When the image signal RGB is a still image and the flicker index FK is equal to or less than a predetermined value, the frequency determination part 216 changes the driving frequency and outputs a driving frequency signal FREQ corresponding to the changed driving frequency. For example, when the image signal RGB is not a still image (or a moving image), the frequency determination part 216 may determine the driving frequency as 60 Hz. When the image signal RGB is a still image and the flicker index FK is not greater than the predetermined value, the frequency determination part 216 may change the driving frequency from 60 Hz to a lower driving frequency ranging from 1 Hz to 10 Hz.

When the driving frequency is lowered, a user may perceive a flicker when the image signal RGB includes a specific pattern. In this case, the flicker index FK may be high, and the frequency determination part 216 may not change the driving frequency even when the image signal RGB is determined to be a still image.

The driving frequency controller 210 of an embodiment selectively changes the driving frequency depending on whether the image signal RGB is a still image and whether the image signal RGB includes a pattern that may cause a flicker, Accordingly, the driving frequency controller 210 may prevent display quality degradation of the display panel DP while reducing power consumption of the display device.

Figure 6:
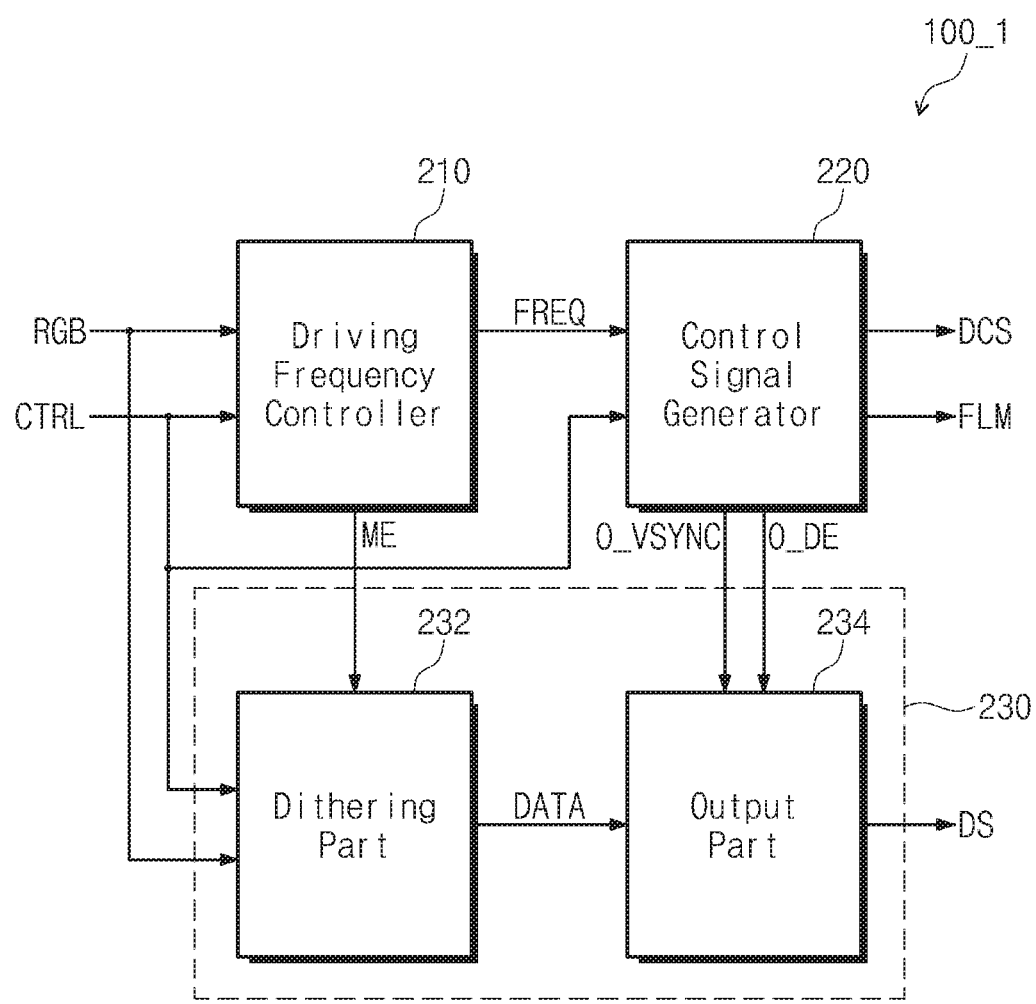
FIG. 6 is a block diagram of a driving controller according to an embodiment of the inventive concept.

FIG. 6 is a block diagram of a driving controller 100_1 according to an embodiment of the inventive concept.

The driving controller 100_1 includes the driving frequency controller 210, the control signal generator 220, and the image processor 230 that includes a dithering part 232 and an output part 234. The driving controller 100_1 illustrated in FIG. 6 has some components that are the same as or similar to those of the driving controller 100 illustrated in FIG. 4, and duplicate description thereof will be omitted.

The dithering part 232 receives the image signal RGB, the control signal CTRL, and the masking enable signal ME, and outputs image data DATA to the output part 234. The dithering part 232 outputs the image data DATA to the output part 234 by sequentially changing a part of bits of the image signal RGB to a plurality of dither patterns in synchronization with the control signal CTRL when the masking enable signal ME is at the active level.

The output part 234 outputs the image data DATA as the data signal DS in synchronization with the output synchronization signal O_VSYNC and the output data enable signal O_DE that are received from the control signal generator 220.

FIGS. 7A to 7D illustrate an exemplary operation of the dithering part 232 illustrated in FIG. 6.

Referring to FIG. 6 and FIGS. 7A to 7D, when a bit width (or a bit depth) of the data signal DS is smaller than a bit width of the image signal RGB, the dithering part 232 may induce an effect of making the gradation range of an image displayed on the display panel DP (see FIG. 3) to be greater than the bit width of the data signal DS.

For example, when the image signal RGB is a 12-bit signal, and the data signal DS is a 10-bit signal, the dithering part 232 may output the ten most significant bits of the image signal RGB as the image data DATA, and express the two least significant bits of the image signal RGB by using temporally/spatially dispersed dither patterns.

The dithering part 232 includes a plurality of dither patterns having a size of a×b (where, each of a and b is a natural number). In an embodiment, the dithering part 232 may dither the image signal RGB using dither patterns P01 to P04, P11 to P14, P21 to P24, and P31 to P34 having a size of 4×4 array. Each of the dither patterns P01 to P04, P11 to P14, P21 to P24, and P31 to P34 having a size of 4×4 array may correspond to a group of pixels having a size of 4×4 array. In other words, one dither pattern having a size of 4×4 array corresponds to pixels having a size of 4×4 array.

The dithering part 232 employs the dither patterns P01 to P04, P11 to P14, P21 to P24, and P31 to P34 of first to fourth groups PG1 to PG4 based on the two least significant bits of the image signal RGB. In each of the first to fourth groups PG1 to PG4, a different number of '1's is spatially dispersed, and the dithering part 232 outputs the dither patterns of one of the first to fourth groups PG1 to PG4 including the dither patterns P01 to P04, P11 to P14, P21 to P24, and P31 to P34 at a temporal sequence in consecutive frames. The dithering part 232 may include a memory (or a lookup table) for storing the dither patterns P01 to P04, P11 to P14, P21 to P24, and P31 to P34.

For example, the dithering part 232 uses the dither patterns P01 to P04 of the first group PG1 when the two least significant bits of the image signal RGB are '00', uses the dither patterns P11 to P14 of the second group PG2 when the two least significant bits are '01', uses the dither patterns P21 to P24 of the third group PG3 when the two least significant bits are '10', and uses the dither patterns P31 to P34 of the fourth group PG4 when the two least significant bits are '11'. The dithering part 232 increases portions of the image signal RGB corresponding to '1's of the dither patterns P11 to P14, P21 to P24, and P31 to P34 of the second to fourth groups PG2 to PG4 and outputs the increased portions of the image signal RGB as corresponding portions of the image data DATA, and outputs portions of the image signal RGB corresponding to '0's as corresponding portions of the image data DATA without a change.

Figure 7A:
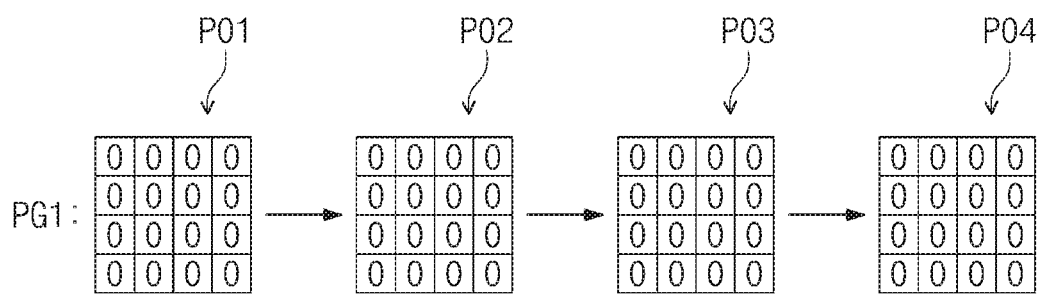

Referring to FIGS. 6 and 7A, when the two least significant bits of the image signal RGB are '00', the dithering part 232 converts the image signal RGB into the image data DATA by using the dither patterns P01 to P04 of the first group PG1. The dither patterns P01 to P04 of the first group PG1 include only '0's. Accordingly, when the dithering part 232 sequentially applies the dither patterns P01 to P04 to the image signal RGB in four consecutive frames, the image data DATA are the same as the ten most significant bits of the image signal RGB.

Figure 7B:
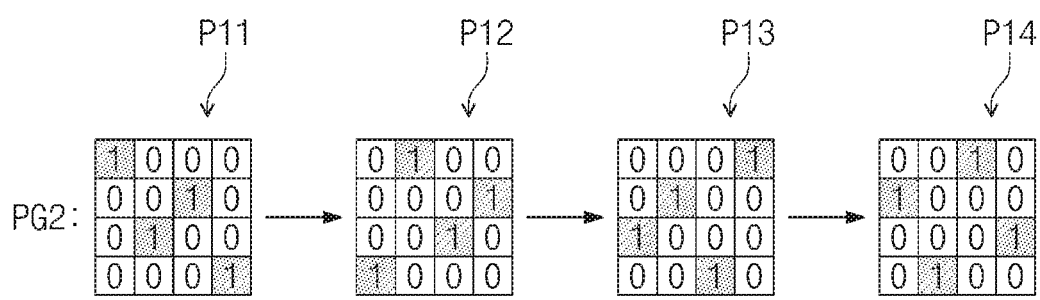

Referring to FIGS. 6 and 7B, when the two least significant bits of the image signal RGB are '01', the dithering part 232 converts the image signal RGB into the image data DATA by using the dither patterns P11 to P14 of the second group PG2. Each of the dither patterns P11 to P14 of the second group PG2 includes four '1's and twelve '0's. In addition, the positions of '1's in the dither patterns P11 to P14 may change every frame. The dithering part 232 sequentially applies the dither patterns P11 to P14 to the image signal RGB in four consecutive frames having the same effect as outputting a gradation level higher by 0.25 times one part of gradation for the eight most significant bits of the image signal RGB as the image data DATA. For example, when the eight most significant bits of the image signal RGB indicate a gradation level of 126, images corresponding to gradation levels of 127, 126, 126, and 126 are sequentially displayed in a predetermined pixel of the display panel DP (see FIG. 3) in the four consecutive frames, and a user may view the images as an image of a gradation level of 126.25.

Figure 7C:
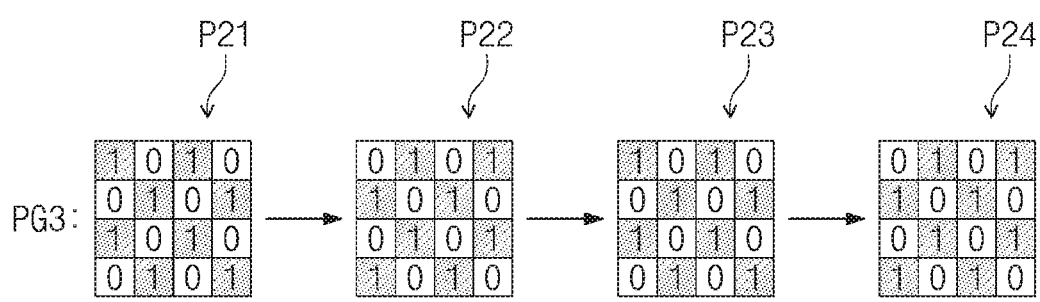

Referring to FIGS. 6 and 7C, when the two least significant bits of the image signal RGB are '10', the dithering part 232 converts the image signal RGB into the image data DATA by using the dither patterns P21 to P24 of the third group PG3. Each of the dither patterns P21 to P24 of the third group PG3 includes eight Ts and eight '0's. In addition, the positions of '1's in the dither patterns P21 to P24 of the third group PG3 may change every frame. The dithering part 232 sequentially applies the dither patterns P21 to P24 to the image signal RGB in four consecutive frames having the same effect as outputting a gradation level higher by 0.5 times the one part of gradation for the eight most significant bits of the image signal RGB as the image data DATA. For example, when the eight most significant bits of the image signal RGB indicate a gradation level of 126, images corresponding to gradation levels of 127, 126, 127, and 126 are sequentially displayed in a predetermined pixel of the display panel DP (see FIG. 3) in the four consecutive frames, and a user may view the images as an image of a gradation level of 126.5.

Referring to FIGS. 6 and 7D, when the two least significant bits of the image signal RGB are '11', the dithering part 232 converts the image signal RGB into the image data DATA by using the dither patterns P31 to P34 of the fourth group PG4. Each of the dither patterns P31 to P34 of the fourth group PG4 includes 12 '1's and four '0's. In addition, the positions of '1's in the dither patterns P31 to P34 may change every frame. The dithering part 232 sequentially applies the dither patterns P31 to P34 to the image signal RGB in four consecutive frames having the same effect as outputting a gradation level higher by 0.75 times the one part of gradation for the eight most significant bits of the image signal RGB as the image data DATA. For example, when the eight most significant bits of the image signal RGB indicate a gradation level of 126, images corresponding to gradation levels of 127, 127, 127, and 126 are sequentially displayed in a predetermined pixel of the display panel DP (see FIG. 3) in the four consecutive frames, and a user may view the images as an image of a gradation level of 126.75.

FIGS. 7A to 7D exemplarily illustrate an example in which the image signal RGB is a 12-bit signal and the data signal DS is a 10-bit signal, and the dithering part 232 uses the two least significant bits of the image signal RGB to apply one of the dither patterns P01 to P04, P11 to P14, P21 to P24, and P31 to P34 of the first to fourth groups PG1 to PG4, and continuously output the image data DATA for four frames. Accordingly, a user may perceive that an image corresponding to a 12-bit data signal DS is displayed even when the data signal DS has a bit width of 10 bits.

In FIGS. 7A to 7D, the dithering part 232 changes the two least significant bits of the image signal RGB in four frames and outputs the changed bits, but the inventive concept is not limited thereto. In other words, the dithering part 232 may change x number (where x is a natural number) of the least significant bits of the image signal RGB in y number of frames, and output the image data DATA. In addition, the dither patterns P01 to P04, P11 to P14, P21 to P24, and P31 to P34 illustrated in FIGS. 7A to 7D are merely an example according to an embodiment, and the inventive concept is not limited thereto. The order of the dither patterns P01 to P04, P11 to P14, P21 to P24, and P31 to P34 in the first to fourth groups PG1 to PG4 may also be variously changed without deviating from the scope of the present disclosure.

Figure 8A:
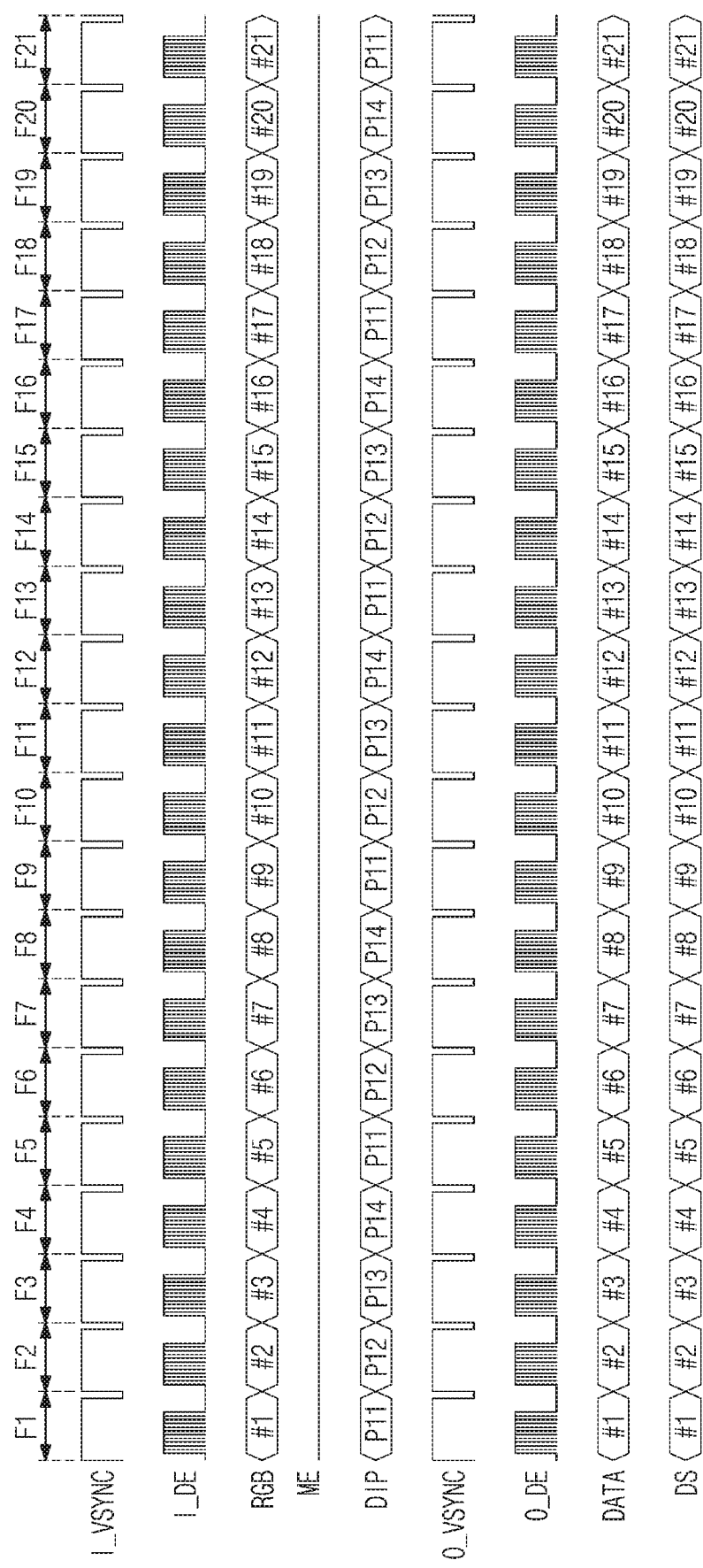
FIGS. 8A, 8B, and 8C are timing diagrams for exemplarily describing an operation of the driving controller illustrated in FIG. 6.
Figure 8B:
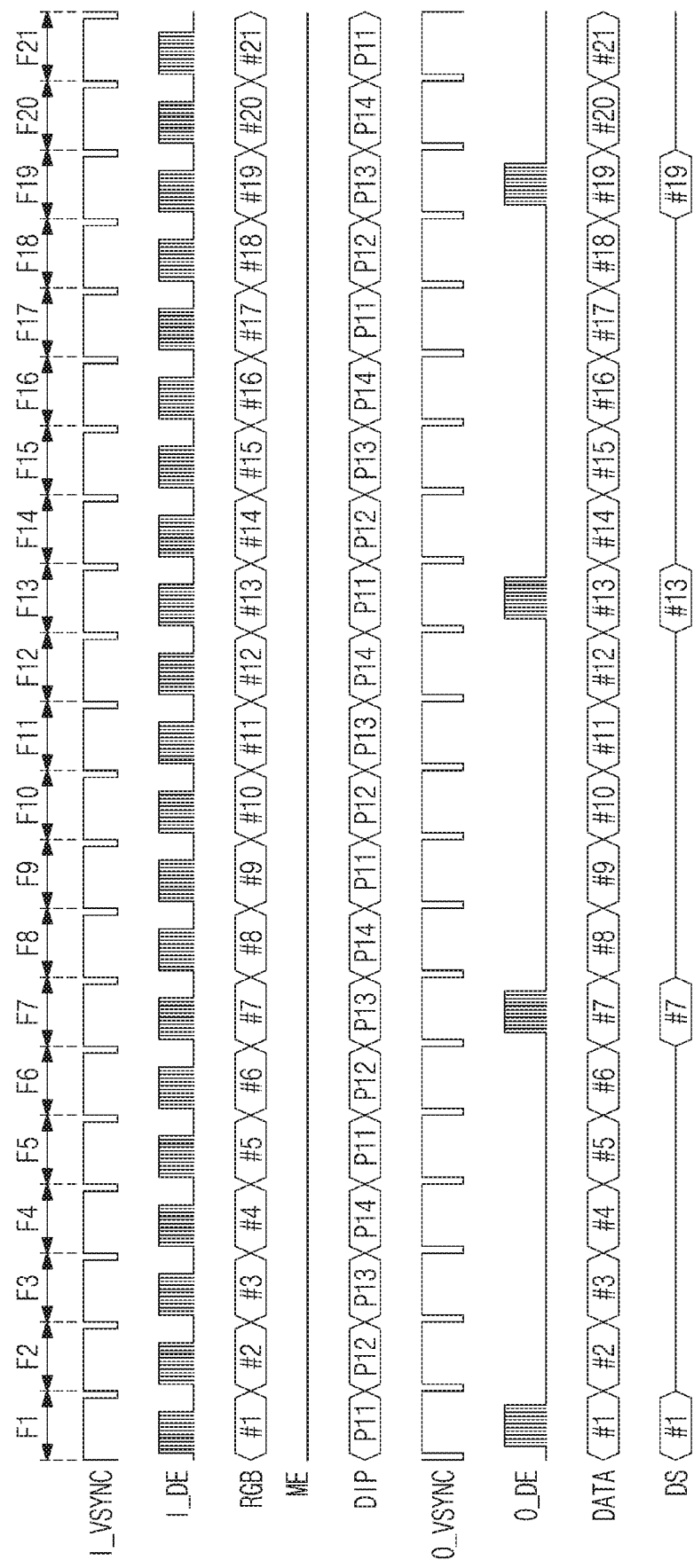
Figure 8C:
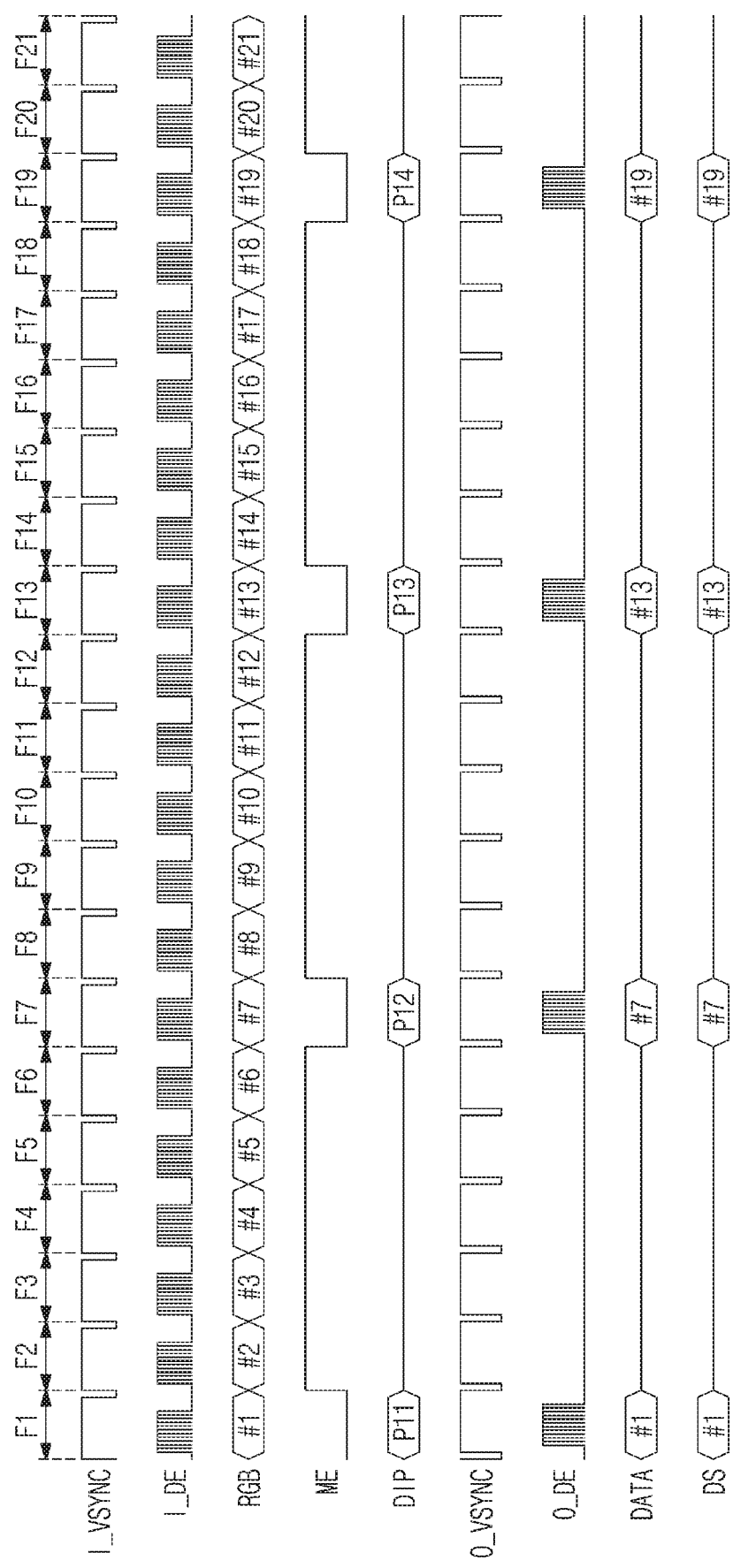

FIGS. 8A to 8C are timing diagrams for exemplarily describing an operation of the driving controller 100_1 illustrated in FIG. 6.

Referring to FIGS. 6 and 8A, the control signal CTRL may include the input synchronization signal I_VSYNC and the input data enable signal I_DE. The input synchronization signal I_VSYNC may be a vertical synchronization signal indicating a start of a frame.

The driving frequency controller 210 receives the image signal RGB in synchronization with the input synchronization signal I_VSYNC and the input data enable signal I_DE. The driving frequency controller 210 determines a driving frequency based on the image signal RGB, and outputs the driving frequency signal FREQ corresponding to the determined driving frequency. In addition, the driving frequency controller 210 outputs the masking enable signal ME corresponding to the determined driving frequency to the dithering part 232.

The control signal generator 220 outputs the output synchronization signal O_VSYNC and the output data enable signal O_DE to the output part 234 in response to the input synchronization signal I_VSYNC, the input data enable signal I_DE, and the driving frequency signal FREQ.

FIG. 8A is a timing diagram illustrating the operation of the driving controller 100_1 in the case that the driving frequency controller 210 outputs a masking enable signal ME having the active level (for example, the low level) when the image signal RGB is not a still image. In this case, the driving frequency controller 210 outputs the masking enable signal ME having the active level (e.g., the low level). While the masking enable signal ME is at the active level, the dithering part 232 dithers the image signal RGB every frame in synchronization with the input synchronization signal I_VSYNC and outputs the image data DATA. The control signal generator 220 outputs the output synchronization signal O_VSYNC and the output data enable signal O_DE respectively having the same frequencies as the input synchronization signal I_VSYNC and the input data enable signal I_DE when the driving frequency signal FREQ has the same frequency as the input synchronization signal I_VSYNC.

The dithering part 232 selects, depending on the two least significant bits of the image signal RGB, any one group among the first to fourth groups PG1 to PG4 exemplarily illustrated in FIGS. 7A to 7D as a dither pattern DIP, and performs dithering according to the selected dither pattern DIP. For example, when the two least significant bits of the image signal RGB are '01', the dithering part 232 selects the dither patterns P11 to P14 of the second group PG2 illustrated in FIG. 7B as the dither pattern DIP, and dithers the image signal RGB according to the dither patterns P11 to P14 of the second group PG2.

In FIGS. 8A to 8C, "#1," "#2," "#3," "#4," etc. of the image signal RGB indicate corresponding frame numbers, and respectively represent an image signal RGB (hereinafter denoted by image signal RGB #1) of a first frame F1, an image signal RGB (hereinafter denoted by image signal RGB #2) of a second frame F2, an image signal RGB (hereinafter denoted by image signal RGB #3) of a third frame F3, and an image signal RGB (hereinafter denoted by image signal RGB #4) of a fourth frame F4, etc. Hereinafter, the image signal RGB, the image data DATA, the data signal DS, or the like in each frame may be denoted by the reference numerals as referenced above (for example, the image signal RGB, image data DATA, the data signal DS, or the like in an n-th frame Fn are respectively denoted by RGB #n, DATA #n, DS #n, or the like). In addition, "#1," "#2," "#3," "#4," etc. of the image data DATA respectively represent image data DATA #1 of the first frame F1, image data DATA #2 of the second frame F2, image data DATA #3 of the third frame F3, and image data DATA #4 of the fourth frame F4, etc.

For example, the dithering part 232 dithers the image signal RGB #1 using the dither pattern P11 and outputs the image data DATA #1 during the first frame F1, and dithers the image signal RGB #2 using the dither pattern P12 and outputs the image data DATA #2 during the second frame F2. The dithering part 232 may perform the dithering operation while the masking enable signal ME is at the active level (e.g., the low level).

The output part 234 outputs the image data DATA as the data signal DS in synchronization with the output synchronization signal O_VSYNC and the output data enable signal O_DE.

Referring to FIGS. 6 and 8B, when the image signal RGB is determined to be a still image, the driving frequency controller 210 outputs the driving frequency signal FREQ that is lower than the frequency of the input synchronization signal I_VSYNC. For example, when the frequency of the input synchronization signal I_VSYNC is 60 Hz, the driving frequency may be changed to 10 Hz. The driving frequency controller 210 outputs the masking enable signal ME that corresponds to a change of the driving frequency. The masking enable signal ME may indicate that periodically transitions between the active level and the inactive level to hold or mask the output of the image data DATA according to the change of the driving frequency. The frequency of the masking enable signal ME may correspond to the driving frequency. For example, when the driving frequency decreases from 60 Hz to 10 Hz, the masking enable signal ME may be maintained at the inactive level of the high level for the first five frames and transitions to the active level of the low level in the sixth frame. When the driving frequency is 5 Hz, the masking enable signal ME may transition to the active level of the low level every 12 frames.

The dithering part 232 dithers the image signal RGB in synchronization with the input synchronization signal I_VSYNC while the masking enable signal ME is at the active level (e.g., the low level), and outputs the image data DATA correspondingly. For example, the dithering part 232 holds the dithering operation while the masking enable signal ME is at the inactive level (e.g., the high level) and does not output the image data DATA.

The control signal generator 220 outputs the output synchronization signal O_VSYNC that results from the change of the frequency of the input synchronization signal I_VSYNC in response to the driving frequency signal FREQ, and the output data enable signal O_DE.

FIG. 8B is a timing diagram illustrating the operation of the driving controller 100_1 when the image signal RGB is determined to be a still image, according to one embodiment. In this case, the driving frequency controller 210 outputs the masking enable signal ME having the active level (for example, the low level).

As illustrated in FIG. 8B, the dithering part 232 dithers the image signal RGB in synchronization with the input synchronization signal I_VSYNC while the masking enable signal ME is at the active level (e.g., the low level), and outputs the image data DATA. For example, the dithering part 232 selects the dither patterns P11, P13, P11, and P13 of the second group PG2, and the dither patterns P11, P12, P13, and P14 are repeated in synchronization with the input synchronization signal I_VSYNC to correspond to the image DATA, i.e., DATA #1 to DATA #4, DATA #5 to DATA #8, DATA #9 to DATA #12, DATA #13 to DATA #16, and DATA #17 to DATA #21.

The output part 234 outputs the image data DATA as the data signal DS in synchronization with the output synchronization signal O_VSYNC and the output data enable signal O_DE.

In the present example in which the dithering part 232 selects the dither patterns P11, P13, P11, and P13 of the second group PG2, the output part 234 outputs data signals DS #1, DS #7, DS #13, and DS #19 in synchronization with the output synchronization signal O_VSYNC and the output data enable signal O_DE dithered by the dither patterns P11, P13, P11, and P13 that respectively correspond to the data signals DS #1, DS #7, DS #13, and DS #19.

In this case, the dithering part 232 performs dithering using only the two dither patterns P11 and P13 of the four dither patterns P11 to P14 of the second group PG2 illustrated in FIG. 7B. As described with reference to FIGS. 7A to 7D, the dither patterns P01 to P04, P11 to P14, P21 to P24, and P31 to P34 of the first to fourth groups PG1 to PG4 disperse '1's in temporal/spatial manners. When the dithering part 232 performs dithering by repeatedly using only some of the dither patterns P01 to P04, P11 to P14, P21 to P24, and P31 to P34 of the first to fourth groups PG1 to PG4, in the present example, only two dither patterns P11 and P13, a desired gradation level may not be displayed, or a user may perceive a gradation change.

FIG. 8C is a timing diagram illustrating the operation of the driving controller 100_1 when the image signal RGB is determined to be a still image, according to another embodiment. In this case, the driving frequency controller 210 outputs the masking enable signal ME corresponding to a changed driving frequency.

As illustrated in FIG. 8C, the dithering part 232 dithers the image signal RGB in synchronization with the input synchronization signal I_VSYNC while the masking enable signal ME is at the active level (e.g., the low level), and outputs the image data DATA. In addition, the dithering part 232 stops (or holds) the dithering operation while the masking enable signal ME is at the inactive level (e.g., the high level) and does not output the image data DATA.

The dithering part 232 stops (or holds) the dithering operation using the current dither pattern of a selected group while the masking enable signal ME is at the inactive level (e.g., the high level). That is, the dithering part 232 holds the selection of the dither patterns, as opposed to continuously changing the dither pattern, while the masking enable signal ME is at the inactive level, and performs the dithering operation in the next frame using the next dither pattern of the group when the masking enable signal ME transitions back to the active level.

For example, the dithering part 232 dithers the image signal RGB #1 using the dither pattern P11 during the first frame F1 when the masking enable signal ME is at the active level, and outputs the image data DATA #1. The dithering part 232 holds the dithering operation from the second frame F2 to the sixth frame F6 when the masking enable signal ME is at the inactive level (for example, the high level). When the masking enable signal ME transitions back to the active level in the seventh frame F7, the dithering part 232 dithers an image signal RGB #7 using the next dither pattern, i.e., the dither pattern P12, and outputs image data DATA #7.

The output part 234 outputs the image data DATA as the data signal DS in synchronization with the output synchronization signal O_VSYNC and the output data enable signal O_DE.

The output part 234 outputs the data signals DS #1, DS #7, DS #13, and DS #19 in synchronization with the output synchronization signal O_VSYNC and the output data enable signal O_DE dithered by the dither patterns P11, P12, P13, and P14.

When the display device DD (see FIG. 3) operates in a low frequency mode to reduce power consumption, the driving controller 100_1 may adjust the order of applying the dither patterns by holding the dithering operation of the dithering part 232. Accordingly, quality degradation of a displayed image may be alleviated or prevented when the display device DD operates in the low frequency mode.

Figure 9:
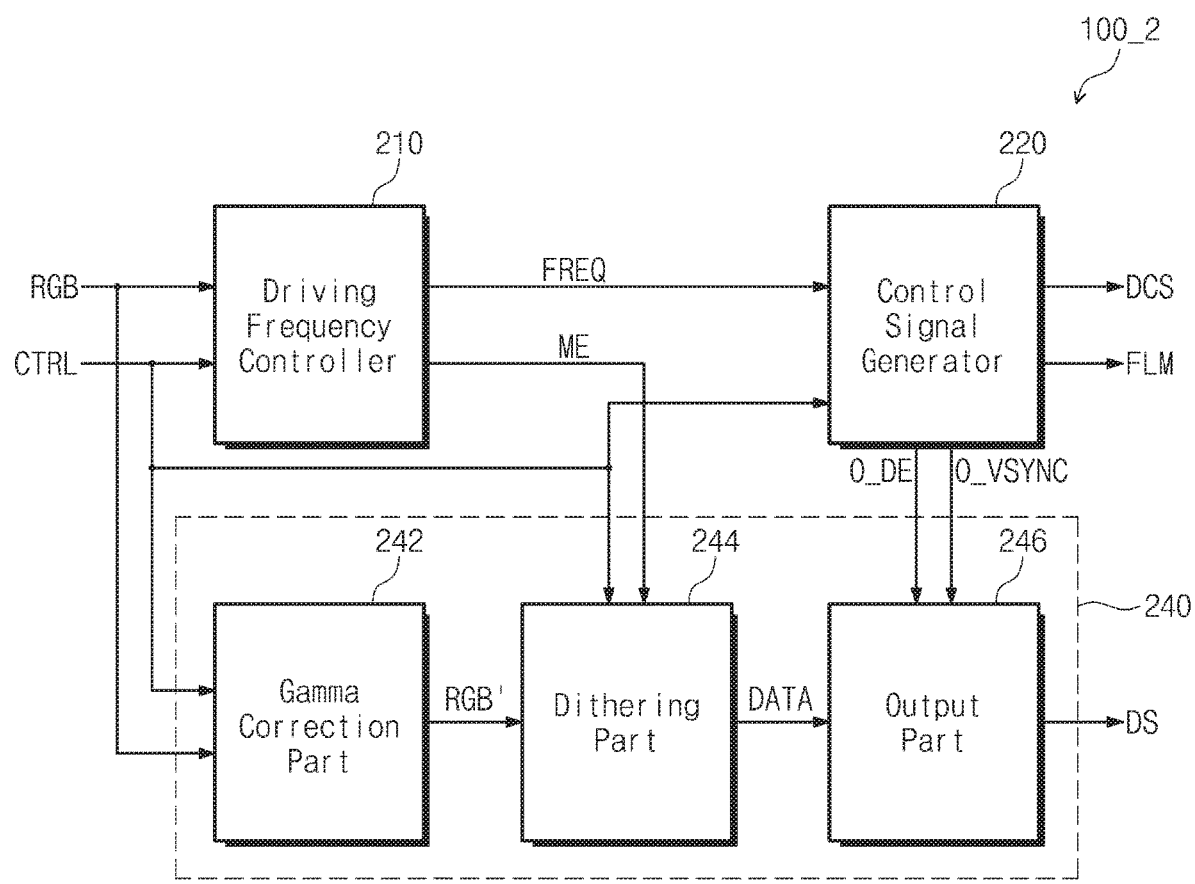
FIG. 9 is a block diagram of a driving controller according to another embodiment of the inventive concept.

FIG. 9 is a block diagram of a driving controller 100_2 according to another embodiment of the inventive concept.

As illustrated in FIG. 9, the driving controller 100_2 includes the driving frequency controller 210, the control signal generator 220, and an image processor 240. The driving controller 100_2 illustrated in FIG. 9 has some components that are the same as or similar to those of the driving controller 100_1 illustrated in FIG. 6, and duplicate description thereof will be omitted.

The image processor 240 includes a gamma correction part 242, a dithering part 244, and an output part 246. In some embodiments, an image processor 240 may further include various functional blocks, parts, or circuits for image signal processing in addition to the gamma correction part 242.

The gamma correction part 242 performs gamma correction on the image signal RGB and outputs a corrected image signal RGB'. The gamma correction part 242 may be implemented as a dynamic capacitance compensation (DCC) functional block, a part, or a circuit that performs response speed compensation depending on a difference between an image signal of a previous frame and an image signal of a current frame. In another embodiment, a gamma correction part 242 may be a part, a functional block, or a circuit for luminance compensation depending on the characteristics of the image signal RGB. In another embodiment, a gamma correction part 242 may be a functional block, a part, or a circuit for gamma change corresponding to a gradation curve that is changed according to user setting.

The dithering part 244 receives the corrected image signal RGB', the control signal CTRL, and the masking enable signal ME, and outputs image data DATA. The dithering part 244 outputs the image data DATA by sequentially changing a part of bits of the corrected image signal RGB' to a plurality of dither patterns as exemplarily illustrated in FIGS. 7A to 7D in synchronization with the control signal CTRL.

The output part 246 outputs the image data DATA as the data signal DS in synchronization with the output data enable signal O_DE and the output synchronization signal O_VSYNC.

The dithering part 244 and the output part 246 may operate in the same manner as the dithering part 232 and the output part 234 illustrated in FIG. 6.

Figure 10:
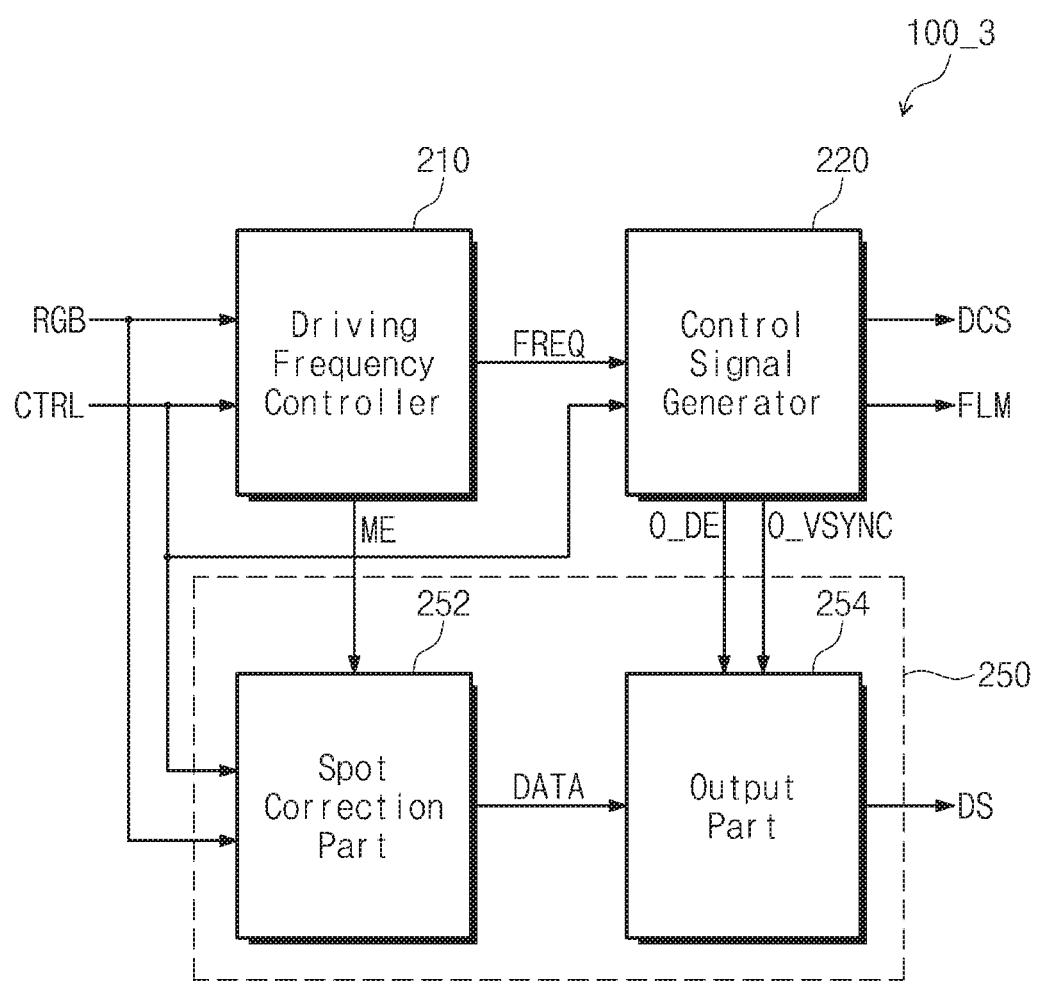
FIG. 10 is a block diagram of a driving controller according to another embodiment of the inventive concept.

FIG. 10 is a block diagram of a driving controller 100_3 according to another embodiment of the inventive concept.

As illustrated in FIG. 10, the driving controller 100_3 includes the driving frequency controller 210, the control signal generator 220, and an image processor 250. The driving controller 100_3 illustrated in FIG. 10 has some components that are the same as or similar to those of the driving controller 100_1 illustrated in FIG. 6, and duplicate description thereof will be omitted.

The image processor 250 includes a spot correction part 252 and an output part 254.

The spot correction part 252 performs spot correction on the image signal RGB and outputs image data DATA. When an image signal RGB corresponding to a specific gradation level is displayed in a large region of the display panel DP (see FIG. 3), a phenomenon may occur that a specific gradation level is viewed or perceived by a user as a spot. In particular, this phenomenon may occur in an image signal RGB corresponding to a low gradation level close to the gradation level of black. The spot correction part 252 may correct the image signal RGB of a specific gradation level so that a user does not perceive spots.

The output part 254 outputs the image data DATA as the data signal DS in synchronization with the output data enable signal O_DE and the output synchronization signal O_VSYNC. The output part 254 may operate in the same manner as the output part 234 illustrated in FIG. 6.

Figure 11A:
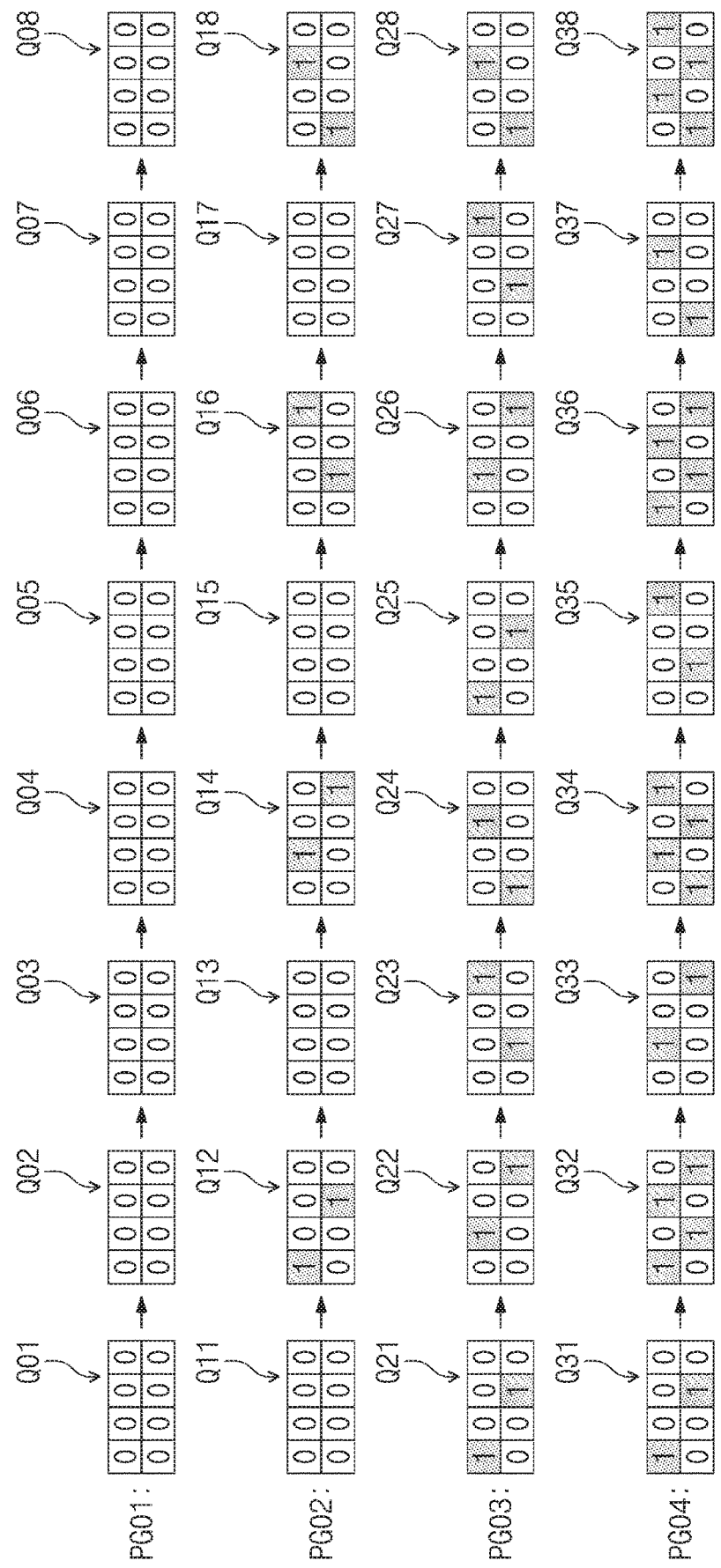
FIGS. 11A and 11B illustrate an exemplary operation of a spot correction part illustrated in FIG. 10.
Figure 11B:
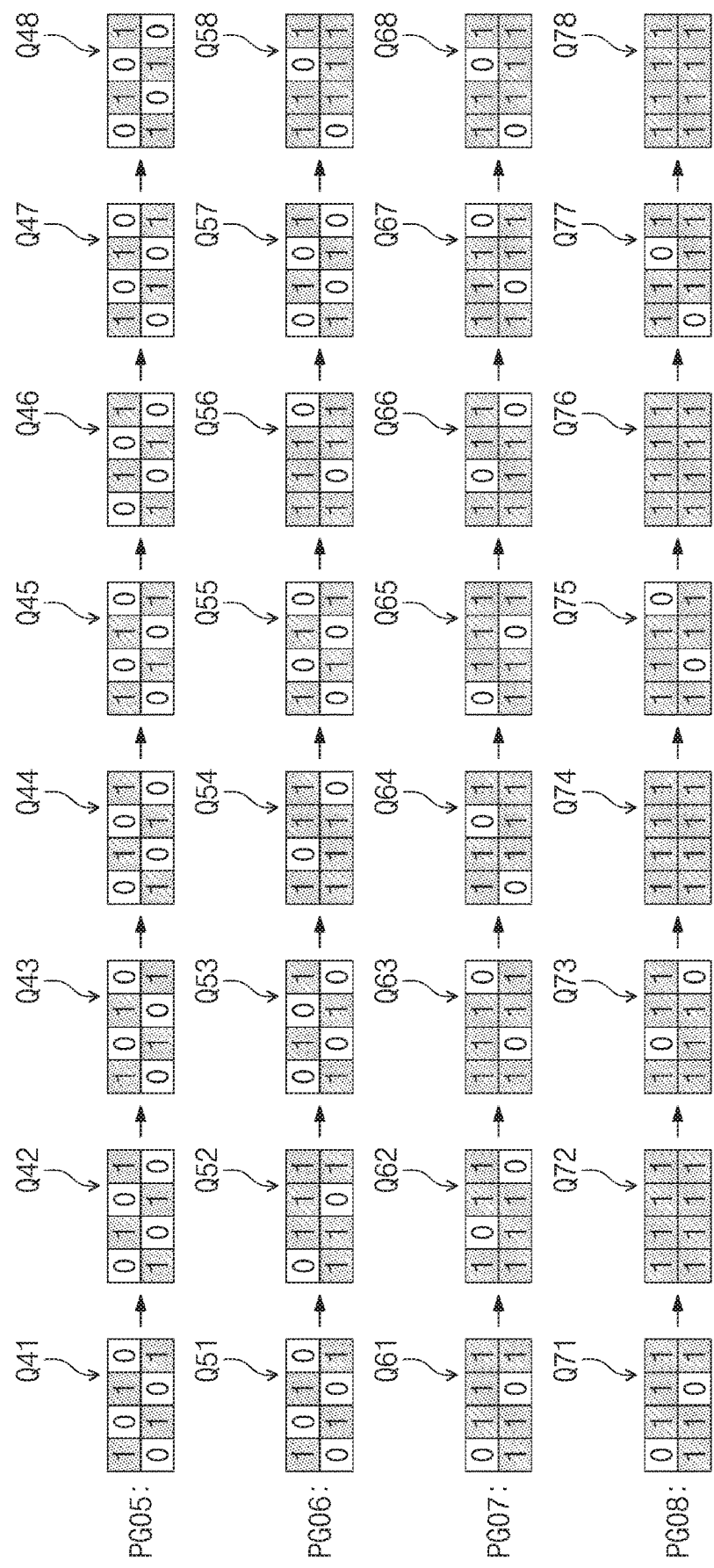

FIGS. 11A and 11B illustrate an exemplary operation of the spot correction part 252 illustrated in FIG. 10.

Referring to FIGS. 10, 11A, and 11B, the spot correction part 252 may change some least significant bits of the image signal RGB to another value when an image signal RGB having a specific gradation level is received, and output the image data DATA.

For example, the image signal RGB may be a 12-bit signal, and the image data DATA may also be a 12-bit signal. The spot correction part 252 may output, without a change, the nine most significant bits of the image signal RGB as corresponding bits of the image data DATA, and a predetermined number of least significant bits (e.g., the three least significant bits) of the image signal RGB may be expressed using temporally/spatially dispersed dither patterns.

The spot correction part 252 includes a plurality of dither patterns having a size of a×b (where, each of a and b is a natural number). In an embodiment, the spot correction part 252 may dither the image signal RGB by using dither patterns Q01 to Q08, Q11 to Q18, Q21 to Q28, Q31 to Q38, Q41 to Q48, Q51 to Q58, Q61 to Q68, and Q71 to Q78 having a size of 4×2 array. Each of the dither patterns Q01 to Q08, Q11 to Q18, Q21 to Q28, Q31 to Q38, Q41 to Q48, Q51 to Q58, Q61 to Q68, and Q71 to Q78 having a size of 4×2 array may correspond to a group of pixels having a size of 4×2 array. In other words, one dither pattern having a size of 4×2 array corresponds to a portion of the image signal RGB to be provided to a group of pixels having a size of 4×2 array.

The spot correction part 252 employs the dither patterns Q01 to Q08, Q11 to Q18, Q21 to Q28, Q31 to Q38, Q41 to Q48, Q51 to Q58, Q61 to Q68, and Q71 to Q78 of first to eighth groups PGO1 to PG08 based on the number least significant bits for dithering, in the present example, the three least significant bits of the image signal RGB. In each of the first to eighth groups PGO1 to PG08, a different number of Ts is spatially dispersed, and the spot correction part 252 outputs the dither patterns of one of the first to eighth groups PGO1 to PG08 including the dither patterns Q01 to Q08, Q11 to Q18, Q21 to Q28, Q31 to Q38, Q41 to Q48, Q51 to Q58, Q61 to Q68, and Q71 to Q78 at a temporal sequence in consecutive frames. The spot correction part 252 may include a memory (or a lookup table) for storing the dither patterns Q01 to Q08, Q11 to Q18, Q21 to Q28, Q31 to Q38, Q41 to Q48, Q51 to Q58, Q61 to Q68, and Q71 to Q78.

Based on the three least significant bits of the 12-bit image signal RGB are any one of '000', '001', '010', '011', '100', '101', '110', and '111', the spot correction part 252 selects and uses the dither patterns of a corresponding group among the first to eighth groups PG01 to PG08. The spot correction part 252 increases portions of the image signal RGB corresponding to Ts in the dither patterns Q11 to Q18, Q21 to Q28, Q31 to Q38, Q41 to Q48, Q51 to Q58, Q61 to Q68, and Q71 to Q78 of the second to eighth groups PG02 to PG08 and outputs the increased portions of the image signal RGB as corresponding portions of the image data DATA, and outputs portions of the image signal RGB corresponding to '0's as corresponding portions of the image data DATA without a change. In a case where the spot correction part 252 performs spot correction operation only for the 12-bit image signal RGB corresponding to a low gradation level close to the gradation level of black, the nine most significant bits of the image signal RGB may be '000000000'.

For example, when the three least significant bits of the image signal RGB are '000', the spot correction part 252 converts the image signal RGB into the image data DATA by using the dither patterns Q01 to Q08 of the first group PG01. The dither patterns Q01 to Q08 of the first group PG01 include only '0's. Accordingly, when the dither patterns Q01 to Q08 are sequentially applied to the image signal RGB in eight consecutive frames, the image data DATA are the same as the image signal RGB.

In another example, when the three least significant bits of the image signal RGB are '010', the spot correction part 252 converts the image signal RGB into the image data DATA by using the dither patterns Q21 to Q28 of the third group PG03. The dither patterns Q21 to Q28 of the third group PG03 each include two '1's. In addition, the positions of '1's in the dither patterns Q21 to Q28 may change every frame. For example, when the image signal RGB is '000000000010' that corresponds to the third group PG03 having a gradation level of 2, images corresponding to gradation levels of 3, 2, 2, 2, 3, 2, 2, and 2 may be sequentially displayed in a predetermined pixel (e.g., the pixel at row 1 and column 1 in the 4×2 pixel array) of the display panel DP (see FIG. 3) in eight consecutive frames. Other pixels in the 4×2 pixel array may display the images of the same gradation levels in a different order, for example, 2, 2, 3, 2, 2, 2, 3, 2, and 2. In this way, a spot may be prevented from being viewed or perceived by a user, by changing the gradation level at a low gradation level at which the spot may be caused.

Figure 12A:
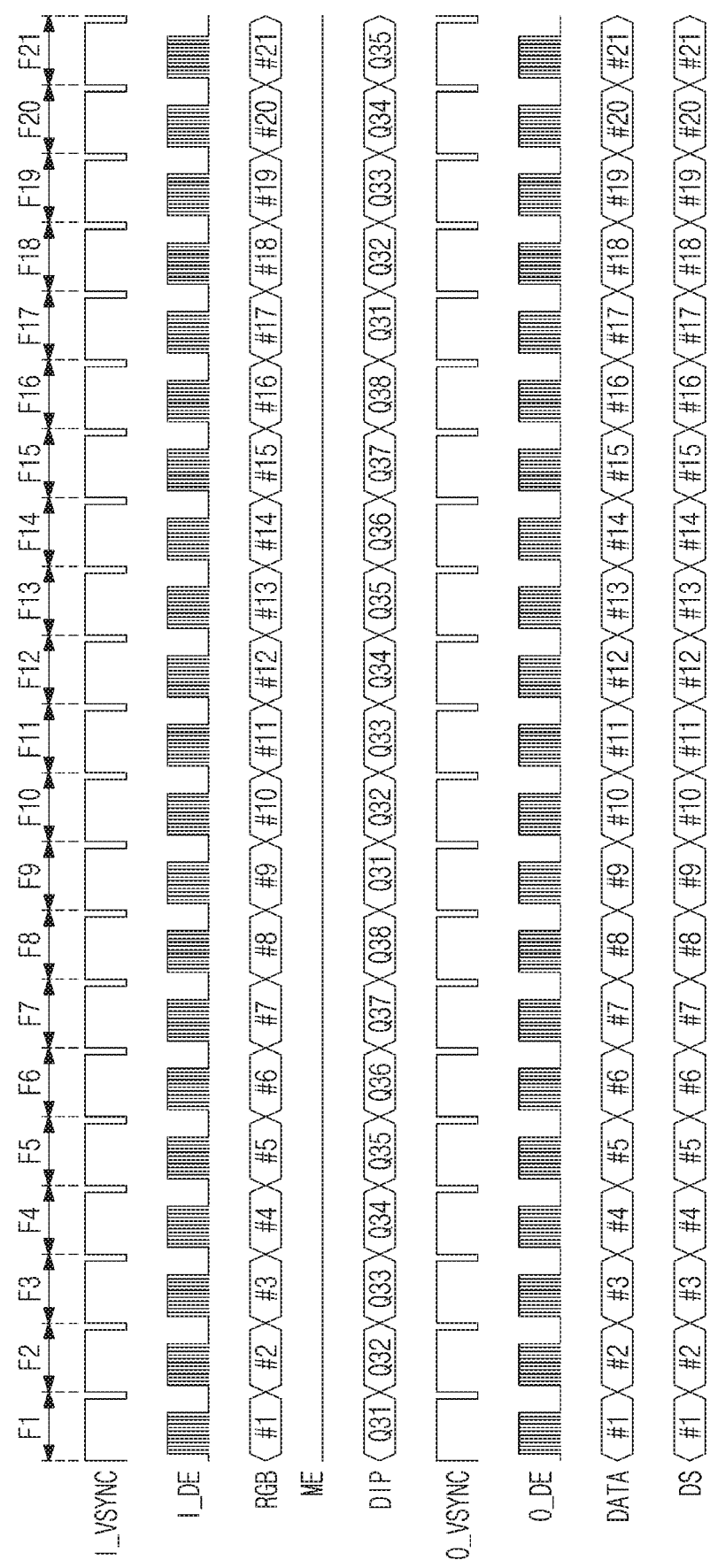
FIGS. 12A and 12B are timing diagrams for exemplarily describing an operation of the driving controller illustrated in FIG. 10.
Figure 12B:
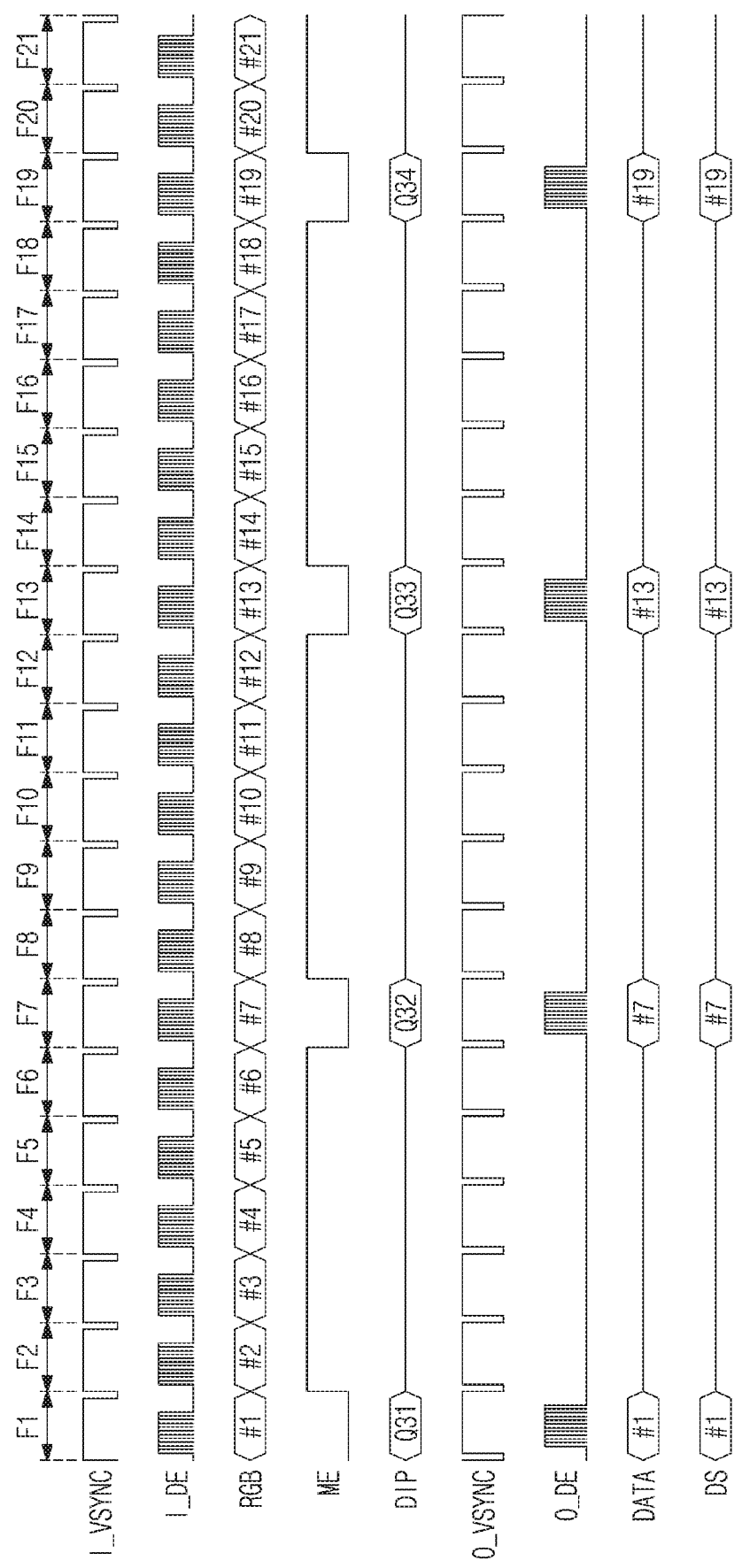

FIGS. 12A and 12B are timing diagrams for exemplarily describing an operation of the driving controller 100_3 illustrated in FIG. 10.

Referring to FIGS. 10, 11A, and 12A, the control signal CTRL may include the input synchronization signal I_VSYNC and the input data enable signal I_DE. The input synchronization signal I_VSYNC may be a vertical synchronization signal indicating a start of a frame.

The driving frequency controller 210 receives the image signal RGB in synchronization with the input synchronization signal I_VSYNC and the input data enable signal I_DE. The driving frequency controller 210 determines a driving frequency of the display panel DP based on the image signal RGB, and outputs the driving frequency signal FREQ corresponding to the determined driving frequency. In addition, the driving frequency controller 210 outputs the masking enable signal ME corresponding to the determined driving frequency.

The control signal generator 220 outputs the output synchronization signal O_VSYNC and the output data enable signal O_DE in response to the input synchronization signal I_VSYNC, the input data enable signal I_DE, and the driving frequency signal FREQ.

In an embodiment, when the image signal RGB is not a still image, the driving frequency controller 210 outputs a masking enable signal ME having the active level (e.g., the low level). While the masking enable signal ME is at the active level, the spot correction part 252 dithers the image signal RGB every frame in synchronization with the input synchronization signal I_VSYNC and outputs the image data DATA. The control signal generator 220 outputs an output synchronization signal O_VSYNC and an output data enable signal O_DE respectively having the same frequencies as the input synchronization signal I_VSYNC and the input data enable signal I_DE when the driving frequency signal FREQ has the same frequency as the input synchronization signal I_VSYNC.

The spot correction part 252 selects, depending on the three least significant bits of the image signal RGB, any one group of the dither patterns Q01 to Q08, Q11 to Q18, Q21 to Q28, Q31 to Q38, Q41 to Q48, Q51 to Q58, Q61 to Q68, and Q71 to Q78 of the first to eighth groups PGO1 to PG08 exemplarily illustrated in FIGS. 11A and 11B as a dither pattern DIP, and performs dithering according to the selected dither pattern DIP. For example, when the three least significant bits of the image signal RGB are '011', the spot correction part 252 selects the dither patterns Q31 to Q38 of the fourth group PG04 illustrated in FIG. 11A as the dither pattern DIP, and performs dithering for the image signal RGB.

In FIGS. 12A and 12B, "#1," "#2," "#3," "#4," etc. of the image signal RGB indicate corresponding frame numbers, and respectively represent the image signal RGB #1 of the first frame F1, the image signal RGB #2 of the second frame F2, the image signal RGB #3 of the third frame F3, and the image signal RGB #4 of the fourth frame F4, etc. In addition, "#1," "#2," "#3," "#4," etc. of image data DATA respectively represent image data DATA #1 of the first frame F1, image data DATA #2 of the second frame F2, image data DATA #3 of the third frame F3, and image data DATA #4 of the fourth frame F4, etc. Similarly, "#1," "#2," "#3," "#4," etc. of the data signal DS respectively represent a data signal DS #1 of the first frame F1, a data signal DS #2 of the second frame F2, a data signal DS #3 of the third frame F3, and a data signal DS #4 of the fourth frame F4, etc.

For example, the spot correction part 252 dithers the image signal RGB #1 using the dither pattern Q31 and outputs the image data DATA #1 during the first frame F1, and dithers the image signal RGB #2 using the dither pattern Q32 and outputs the image data DATA #2 during the second frame F2. The spot correction part 252 may perform the dithering operation while the masking enable signal ME is at the active level (e.g., the low level).

The output part 254 outputs the image data DATA as the data signal DS in synchronization with the output synchronization signal O_VSYNC and the output data enable signal O_DE.

Referring to FIGS. 10, 11A, and 12B, when the image signal RGB is determined to be a still image in an embodiment, the driving frequency controller 210 outputs the masking enable signal ME corresponding to the determined driving frequency. While the masking enable signal ME is at the active level, the spot correction part 252 dithers the image signal RGB every frame in synchronization with the input synchronization signal I_VSYNC and then outputs the image data DATA. In addition, the spot correction part 252 stops (or holds) the dithering operation while the masking enable signal ME is at the inactive level (e.g., the high level), and does not output the image data DATA.

The control signal generator 220 outputs the output synchronization signal O_VSYNC and the output data enable signal O_DE having a driving frequency corresponding to the driving frequency signal FREQ.

The spot correction part 252 selects, depending on the three least significant bits of the image signal RGB, any one group of the dither patterns Q01 to Q08, Q11 to Q18, Q21 to Q28, Q31 to Q38, Q41 to Q48, Q51 to Q58, Q61 to Q68, and Q71 to Q78 of the first to eighth groups PG01 to PG08 exemplarily illustrated in FIGS. 11A and 11B as the dither pattern DIP, and performs dithering according to the selected dither pattern DIP. For example, when the three least significant bits of the image signal RGB are '011', the spot correction part 252 selects the dither patterns Q31 to Q38 of the fourth group PG04 illustrated in FIG. 11A as the dither pattern DIP, and performs dithering for the image signal RGB.

The spot correction part 252 stops (or holds) the dithering operation of the dither pattern while the masking enable signal ME is at the inactive level (e.g., the high level), and performs the dithering operating in the next frame using the next dither pattern of the group when the masking enable signal ME transitions back to the active level.

Referring to FIG. 12B, the spot correction part 252 dithers the image signal RGB #1 using the dither pattern Q31 during the first frame F1 when the masking enable signal ME is at the active level, and outputs the image data DATA #1. The spot correction part 252 holds the dithering operation during the second to sixth frames F2 to F6 when the masking enable signal ME is at the inactive level (for example, the high level). When the masking enable signal ME transitions back to the active level in the seventh frame F7, the spot correction part 252 dithers the image signal RGB #7 using the next dither pattern, i.e., the dither pattern Q32, and outputs image data DATA #7.

The output part 254 outputs the data signals DS #1, DS #7, DS #13, and DS #19 in synchronization with the output synchronization signal O_VSYNC and the output data enable signal O_DE dithered by the dither patterns Q31, Q32, Q33, and Q34 that respectively correspond to the data signals DS #1, DS #7, DS #13, and DS #19.

When the display device DD (see FIG. 3) operates in a low frequency mode to reduce power consumption, the driving controller 100_3 of FIG. 10 may adjust the order of applying the dither patterns by holding the dithering operation of the spot correction part 252. Accordingly, quality degradation of a displayed image may be alleviated or prevented when the display device DD operates in the low frequency mode.

Figure 13:
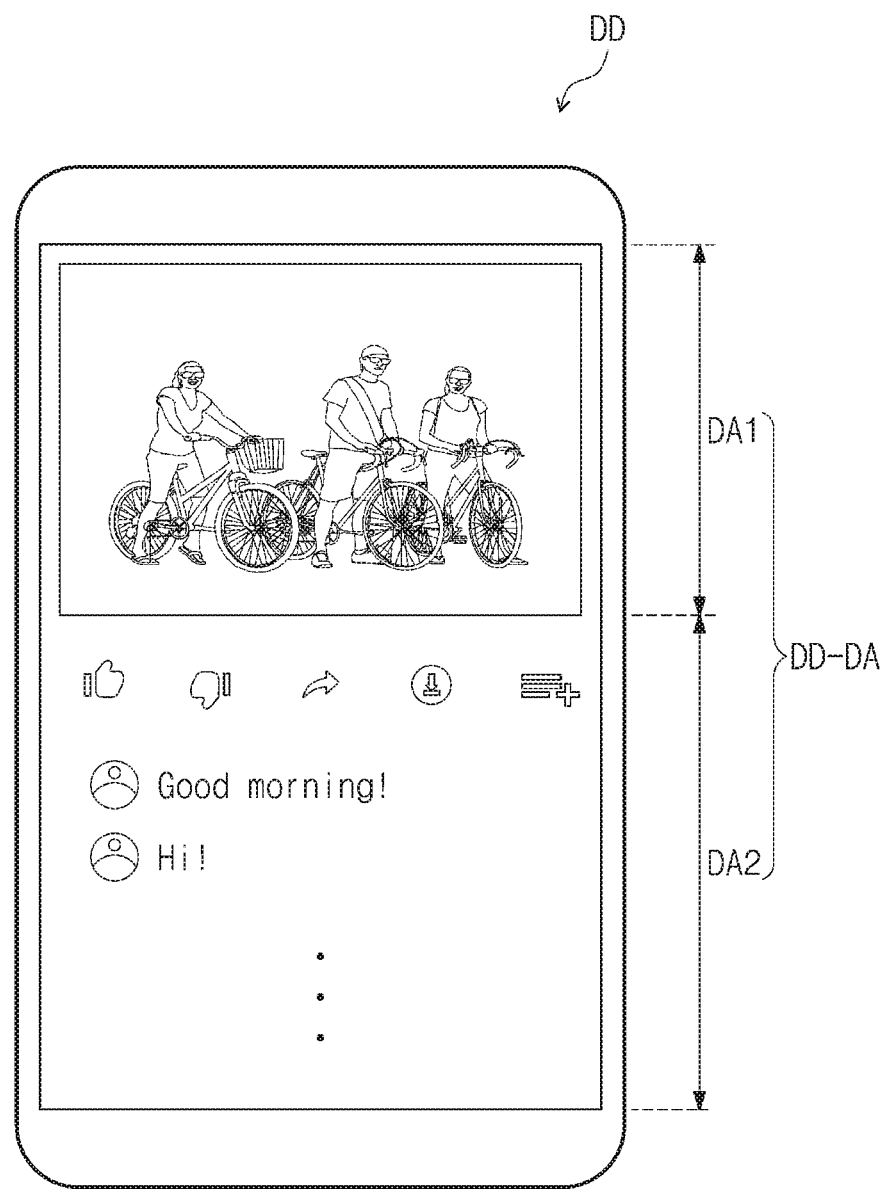
FIG. 13 exemplarily illustrates an image displayed on a display device according to an embodiment of the inventive concept.

FIG. 13 exemplarily illustrates an image displayed on a display device according to an embodiment of the inventive concept.

Referring to FIG. 13, the display region DD-DA of the display device DD includes a first display region DA1 and a second display region DA2. When the display device DD runs a particular application program, a moving image may be displayed in the first display region DA1, and a still image or text information having a long period of display may be displayed in the second display region DA2.

The first display region DA1 may display a moving image and operate at a normal driving frequency, and the second display region DA2 may display a still image may and operate at a driving frequency that is lower than the normal driving frequency. The power consumption of the display device DD may be reduced by lowering the driving frequency of a portion of the display region DD-DA of the display device DD.

The size of each of the first display region DA1 and the second display region DA2 may be a preset size, or may be dynamically changed by an application program running on the display device DD.

Figure 14:
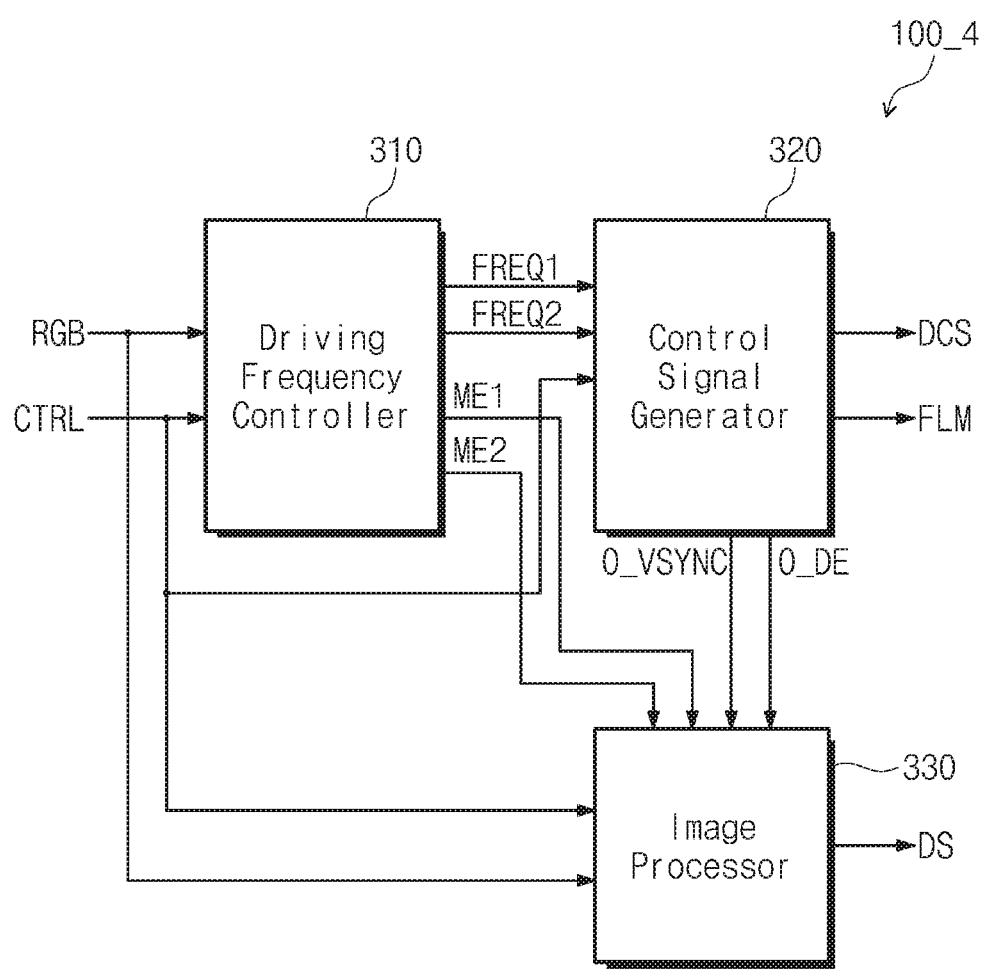
FIG. 14 is a block diagram of a driving controller according to an embodiment of the inventive concept.

FIG. 14 is a block diagram of a driving controller 100_4 according to an embodiment of the inventive concept.

As illustrated in FIG. 14, the driving controller 100_4 includes a driving frequency controller 310, a control signal generator 320, and an image processor 330.

The driving frequency controller 310 receives the image signal RGB and the control signal CTRL from the outside. The control signal CTRL may include the input synchronization signal. The driving frequency controller 310 determines a first driving frequency of the display device DD for the first display region DA1 (see FIG. 13) based on the image signal RGB and the control signal CTRL, and outputs a first driving frequency signal FREQ1 corresponding to the determined first driving frequency. In addition, the driving frequency controller 310 determines a second driving frequency of the display device DD for the second display region DA2 (see FIG. 13) based on the image signal RGB and the control signal CTRL, and outputs a second driving frequency signal FREQ2 corresponding to the determined second driving frequency. The driving frequency controller 310 outputs a first masking enable signal ME1 corresponding to the first driving frequency FREQ1 and a second masking enable signal ME2 corresponding to the second driving frequency FREQ2.

The control signal generator 320 outputs the first control signal DCS, the second control signal FLM, an output synchronization signal O_VSYNC, and an output data enable signal O_DE in response to the control signal CTRL, the first driving frequency signal FREQ1, and the second driving frequency signal FREQ2. The output synchronization signal O_VSYNC and the output data enable signal O_DE may be included in the first control signal DCS and/or the second control signal FLM. As described with reference to FIG. 3, the first control signal DCS is provided to the data driving circuit 110, and the second control signal FLM is provided to the scan driving circuit SDC.

The image processor 330 receives the image signal RGB, the control signal CTRL, the first masking enable signal ME1, the second masking enable signal ME2, the output synchronization signal O_VSYNC, and the output data enable signal O_DE. The output synchronization signal O_VSYNC and the output data enable signal O_DE may be collectively referred to as an output synchronization signal.

The image processor 330 converts the image signal RGB into the data signal DS in synchronization with the control signal CTRL, the first masking enable signal ME1, and the second masking enable signal ME2, and outputs the data signal DS to the data driving circuit 110 (see FIG. 3) in synchronization with the output synchronization signal. In addition, the image processor 330 may sequentially convert some bits of one portion of the image signal RGB corresponding to the first display region DA1 into first image data corresponding to a plurality of dither patterns, in synchronization with the control signal CTRL when the first masking enable signal ME1 is at an active level, and sequentially convert some bits of the other portion of the image signal RGB corresponding to the second display region DA2 into second image data corresponding to a plurality of dither patterns that may be different from the plurality of dither patterns for the first image data, in synchronization with the control signal CTRL when the second masking enable signal ME2 is at an active level. The image processor 330 may output the first image data and the second image data as the data signal DS in synchronization with the output synchronization signal O_VSYNC and the output data enable signal O_DE.

Figure 15:
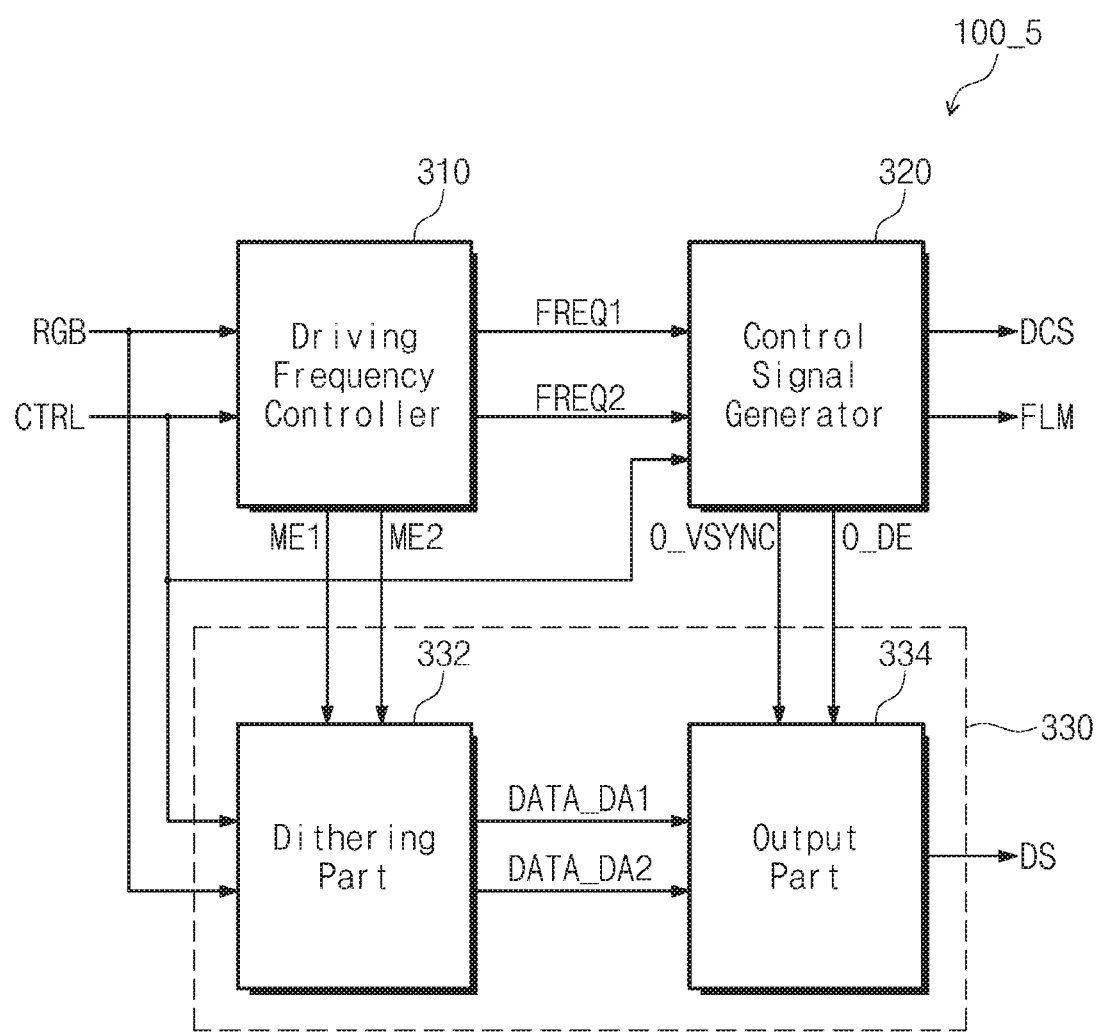
FIG. 15 is a block diagram of a driving controller according to an embodiment of the inventive concept.

FIG. 15 is a block diagram of a driving controller 100_5 according to an embodiment of the inventive concept.

As illustrated in FIG. 15, the driving controller 100_5 includes the driving frequency controller 310, the control signal generator 320, and the image processor 330. The driving controller 100_5 illustrated in FIG. 15 has some components that are the same as or similar to those of the driving controller 100_4 illustrated in FIG. 14, and duplicate description thereof will be omitted.

The image processor 330 includes a dithering part 332 and an output part 334. The dithering part 332 receives the image signal RGB, the control signal CTRL, the first masking enable signal ME1, and the second masking enable signal ME2, and outputs first image data DATA_DA1 and second image data DATA_DA2. The dithering part 332 outputs the first image data DATA_DA1 by sequentially changing a part of bits of the one portion of the image signal RGB corresponding to the first display region DA1 to a plurality of dither patterns in synchronization with the control signal CTRL while the first masking enable signal ME1 is at the active level. The dithering part 332 outputs the second image data DATA_DA2 by sequentially changing a part of bits of the other portion of the image signal RGB corresponding to the second display region DA2 to a plurality of dither patterns that may be different from the plurality of dither patterns for the first image data in synchronization with the control signal CTRL while the second masking enable signal ME2 is at the active level.

The output part 334 outputs the first image data DATA_DA1 and the second image data DATA_DA2 as the data signal DS in synchronization with the output synchronization signal O_VSYNC and the output data enable signal O_DE.

Figure 16A:
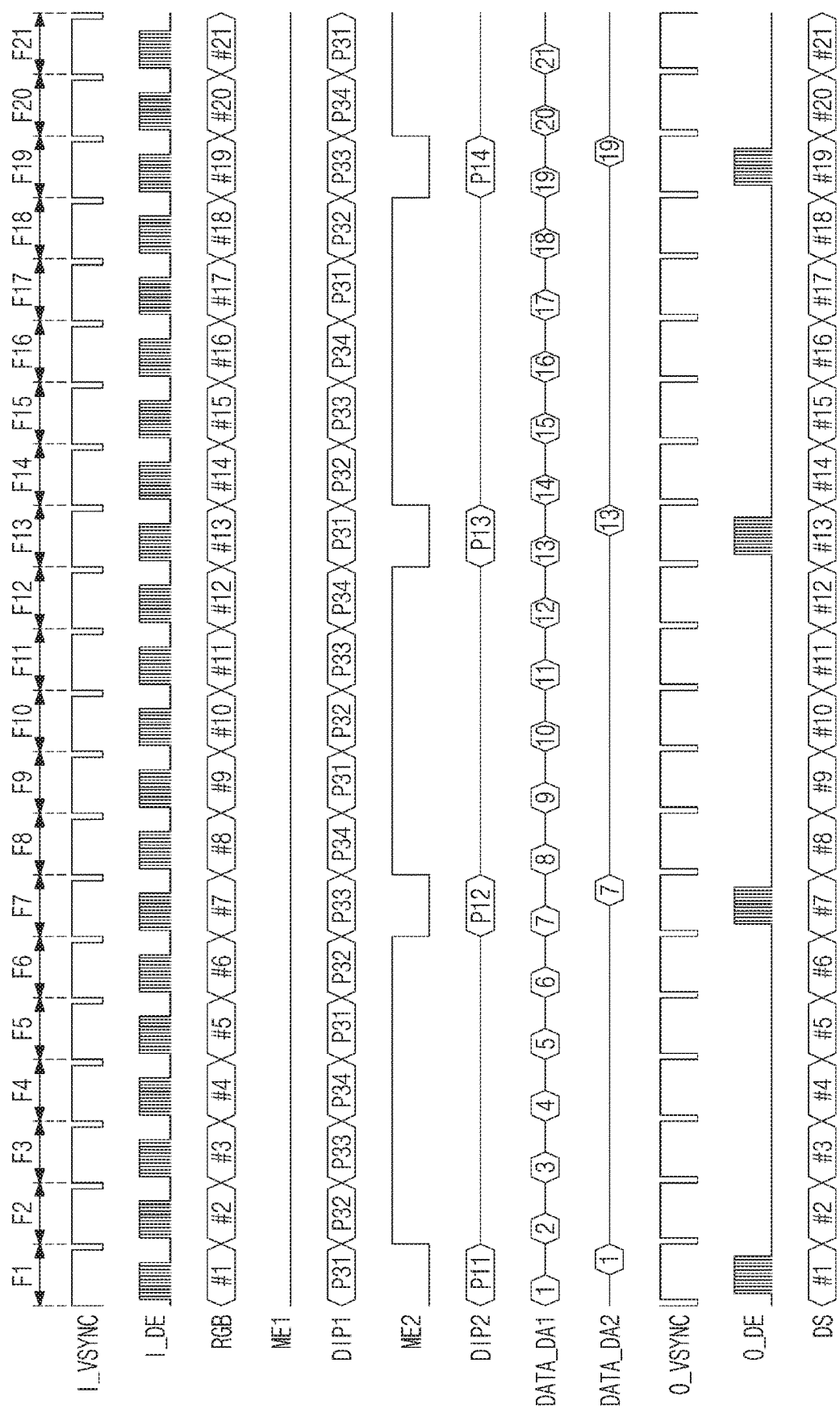
FIGS. 16A and 16B illustrate an exemplary operation of a dithering part illustrated in FIG. 15.
Figure 16B:
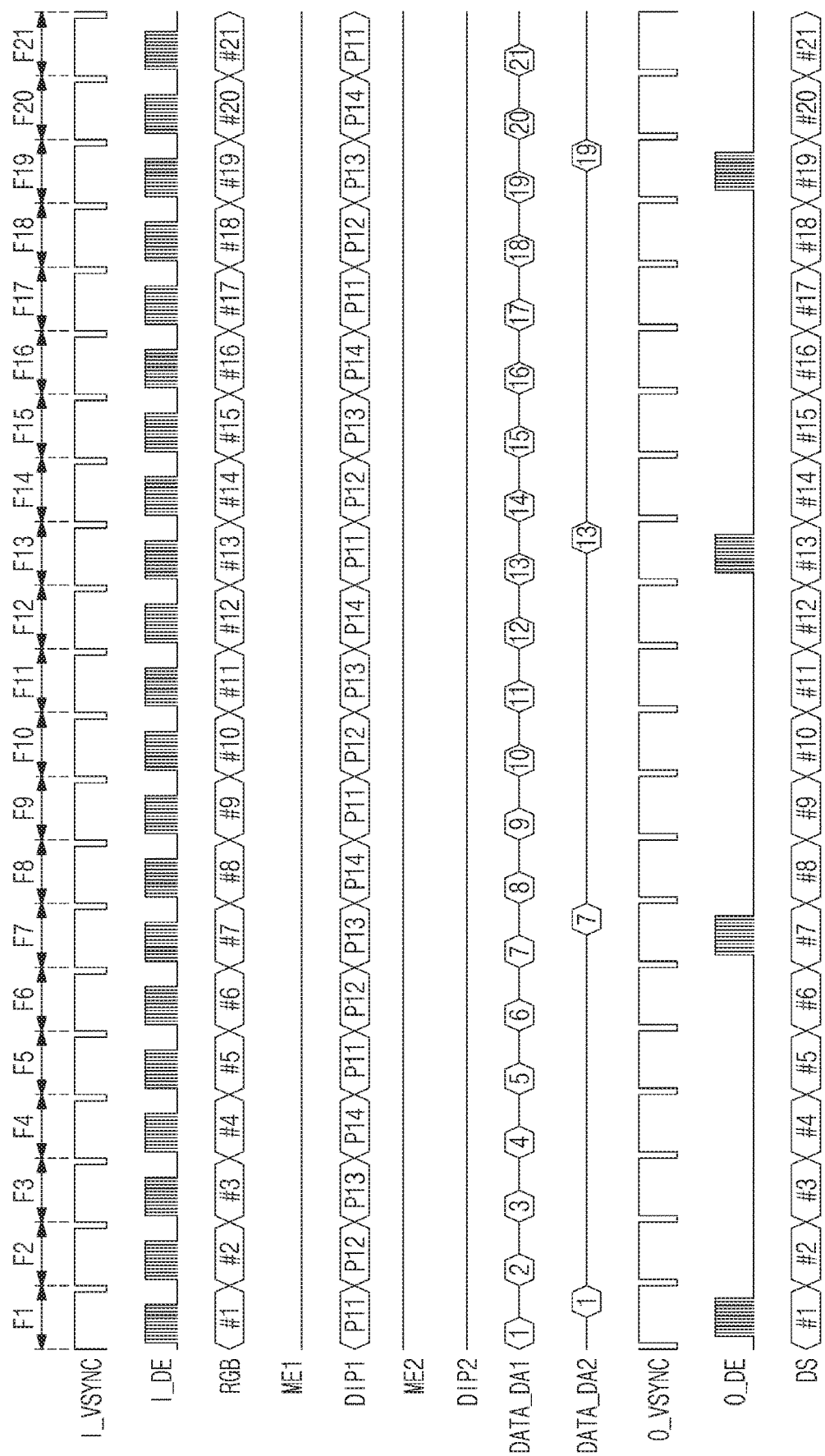

FIGS. 16A and 16B illustrate an exemplary operation of the dithering part 332 illustrated in FIG. 15.

Referring to FIGS. 13, 15, and 16A, when an image signal corresponding to the first display region DA1 of the image signal RGB is a moving image, the driving frequency controller 310 outputs the first driving frequency signal FREQ1 corresponding to the input synchronization signal I_VSYNC, and maintains the first masking enable signal ME1 at the active level (for example, a low level).

When an image signal corresponding to the second display region DA2 of the image signal RGB is a still image, the driving frequency controller 310 outputs the second driving frequency signal FREQ2 corresponding to a driving frequency that is lower than the frequency of the input synchronization signal I_VSYNC, and outputs the second masking enable signal ME2 corresponding to the determined driving frequency.

The dithering part 332 receives the image signal RGB in synchronization with the input synchronization signal I_VSYNC and the input data enable signal I_DE.

The dithering part 332 dithers the image signal RGB corresponding to the first display region DA1 by using a first dither pattern DIP1 while the first masking enable signal ME1 is at the active level (for example, the low level). For example, the dithering part 332 selects, depending on the two least significant bits of the image signal RGB corresponding to the first display region DA1, one group of the dither patterns P01 to P04, P11 to P14, P21 to P24, and P31 to P34 of the first to fourth groups PG1 to PG4 exemplarily illustrated in FIGS. 7A to 7D as the first dither pattern DIP1, performs dithering according to the selected first dither pattern DIP1, and outputs the first image data DATA_DA1. For example, when the two least significant bits of the image signal corresponding to the first display region DA1 of the image signal RGB are '11', the dithering part 332 selects the dither patterns P31 to P34 of the fourth group PG4 illustrated in FIG. 7D as the first dither pattern DIP1.

The dithering part 332 dithers the image signal RGB corresponding to the second display region DA2 by using a second dither pattern DIP2 while the second masking enable signal ME2 is at the active level (for example, a low level), and outputs the second image data DATA_DA2. The dithering part 332 holds the dithering operation of the second dither pattern DIP2 while the second masking enable signal ME2 is at an inactive level (e.g., a high level) and does not output the second image data DATA_DA2.

For example, the dithering part 332 selects, depending on the two least significant bits of the image signal RGB corresponding to the second display region DA2, one group of the dither patterns P01 to P04, P11 to P14, P21 to P24, and P31 to P34 of the first to fourth groups PG1 to PG4 exemplarily illustrated in FIGS. 7A to 7D as the second dither pattern DIP2, and performs dithering according to the selected second dither pattern DIP2. For example, when the two least significant bits of the image signal corresponding to the second display region DA2 of the image signal RGB are '01', the dithering part 332 selects the dither patterns P11 to P14 of the second group PG2 illustrated in FIG. 7B as the second dither pattern DIP2.

The dithering part 332 stops (or holds) the dithering operation of the second dither pattern DIP2 while the second masking enable signal ME2 is at the inactive level (e.g., the high level), and performs the dithering operation using the next dither pattern of the second group PG2 when the second masking enable signal ME2 transitions back to the active level.

For example, the dithering part 332 dithers a portion of the image signal RGB #1 corresponding to the second display region DA2 using the dither pattern P11 during the first frame F1 when the second masking enable signal ME2 is at the active level, and outputs second image data DATA_DA2 #1. The dithering part 332 holds the dithering operation during the second to sixth frames F2 to F6 when the second masking enable signal ME2 is at the inactive level. When the second masking enable signal ME2 transitions back to the active level in the seventh frame F7, the dithering part 332 dithers a portion of the image signal RGB #7 corresponding to the second display region DA2 using the next dither pattern, i.e., the dither pattern P12, and outputs second image data DATA_DA2 #7. The dithering part 332 outputs the second image data DATA_DA2 #1 and DATA_DA2 #7, and second image data DATA_DA2 #13 and DATA_DA2 #19 that are respectively dithered by the dither patterns P11, P12, P13, and P14.

When the driving controller 100_5 operates in a low frequency mode to reduce power consumption, the driving controller 100_5 may adjust the order of applying the dither patterns by holding the dithering operation of the dithering part 332. Accordingly, quality degradation of a displayed image may be alleviated or prevented when the display device DD operates in the low frequency mode.

The output part 334 outputs the first image data DATA_DA1 and the second image data DATA_DA2 as the data signal DS in synchronization with the output synchronization signal O_VSYNC and the output data enable signal O_DE.

The output part 334 outputs data signal DS #1 of the first frame F1, the data signal DS #7 of the seventh frame F7, the data signal DS #13 of the thirteenth frame, and the data signal DS #19 of the nineteenth frame F19 among the data signal DS in synchronization with the output synchronization signal O_VSYNC and the output data enable signal O_DE. The data signal DS includes both a data signal corresponding to the first display region DA1 and a data signal corresponding to the second display region DA2. Data signals of remaining frames, for example, the data signal DS #2 to a data signal DS #6 of the second to sixth frames may include data signals DA corresponding to the first display region DA1

Referring to FIGS. 13, 15, and 16B, when an image signal corresponding to the first display region DA1 of the image signal RGB is a moving image, the driving frequency controller 310 outputs the first driving frequency signal FREQ1 corresponding to the input synchronization signal I_VSYNC, and maintains the first masking enable signal ME1 at the active level (for example, the low level).

When an image signal corresponding to the second display region DA2 of the image signal RGB is a still image, the driving frequency controller 310 outputs the second driving frequency signal FREQ2 corresponding to a driving frequency that is lower than the frequency of the input synchronization signal I_VSYNC, and maintains the second masking enable signal ME2 at the inactive level (for example, the high level).

The dithering part 332 does not perform the dithering operation while the second masking enable signal ME2 is at the inactive level (for example, the high level), and outputs the ten most significant bits of the image signal RGB corresponding to the second display region DA2 as the second image data DATA_DA2 without a change.

The output part 334 outputs the first image data DATA_DA1 and the second image data DATA_DA2 as the data signal DS in synchronization with the output synchronization signal O_VSYNC and the output data enable signal O_DE.

By holding or stopping the dithering operation for the second display region DA2 when the second display region DA2 operates in the low frequency mode, power consumption may be reduced, and the degradation of display quality of the display device DD may be prevented.

In another embodiment, when the second display region DA2 operates in the low frequency mode, the second dither pattern DIP2 may be fixed to any one of dither patterns P01 to P04, P11 to P14, P21 to P24, and P31 to P34 of the first to fourth groups PG1 to PG4 illustrated in FIGS. 7A to 7D.

The above-mentioned driving controller may determine a driving frequency of a display device based on an image signal and output a masking enable signal corresponding to the determined driving frequency. The driving controller may perform dithering only when the masking enable signal is at the active level, thereby preventing the display quality of an image from being degraded when the display device operates in the low frequency mode. In addition, the driving controller of an embodiment of the inventive concept may include a spot correction part to prevent spots from being generated at a low gradation level, and further, may selectively stop the operation of the spot correction part in the low frequency mode. Accordingly, degradation of image display quality may be prevented in the low frequency mode. Further, the driving controller of an embodiment of the inventive concept may operate the first display region and the second display region of the display panel at driving frequencies that are different from each other. In this case, the order of outputting the dither patterns may be changed for the second display region operating in the low frequency mode, and thus quality degradation of a displayed image may be prevented in the low frequency mode.

Although the embodiments of the inventive concept have been described herein, it is understood that various changes and modifications can be made by those skilled in the art within the spirit and scope of the inventive concept. The embodiments described herein are not intended to limit the technical spirit and scope of the present disclosure, and all technical spirit within the scope of the following claims or the equivalents will be construed as being included in the scope of the present disclosure.

What is claimed is:
1. A driving controller comprising:
a driving frequency controller configured to receive an image signal, determine a driving frequency based on the image signal, and output a masking enable signal corresponding to the driving frequency; and
an image processor configured to convert the image signal into a data signal and output the data signal,
wherein the image processor sequentially converts a part of bits of the image signal into the data signal corre- sponding to a plurality of dither patterns based on the masking enable signal being at an active level, and wherein a frequency of the masking enable signal corresponds to the driving frequency based on the driving frequency mismatching a frequency of an input synchronization signal.

2. The driving controller of claim 1, wherein the image processor converts the image signal into the data signal in synchronization with the input synchronization signal based on the masking enable signal being at the active level, and the image processor holds converting the image signal into the data signal based on the masking enable signal being at an inactive level.

3. The driving controller of claim 1, wherein the image processor selects the plurality of dither patterns of a predetermined order based on the masking enable signal being at the active level, and converts the part of bits of the image signal into the data signal by using the plurality of dither patterns, wherein the image processor holds selection of the plurality of dither patterns based on the masking enable signal being at an inactive level.

4. The driving controller of claim 1, further comprising a control signal generator configured to receive the input synchronization signal, and output an output synchronization signal corresponding to the driving frequency.

5. The driving controller of claim 4, wherein the image processor comprises:

a dithering part configured to output image data by sequentially changing the part of bits of the image signal to the plurality of dither patterns in synchronization with the input synchronization signal; and an output part configured to output the image data as the data signal in synchronization with the output synchronization signal.

6. The driving controller of claim 4, wherein the image processor comprises:

a gamma correction part configured to correct a gradation level of the image signal in synchronization with the input synchronization signal and output the image signal having a corrected gradation level;

a dithering part configured to output image data by sequentially changing the part of bits of the image signal to the plurality of dither patterns; and an output part configured to output the image data as the data signal in synchronization with the output synchronization signal.

7. The driving controller of claim 4, wherein the image processor comprises:

a spot correction part configured to output image data by sequentially changing the part of bits of the image signal to a plurality of spot correction patterns in synchronization with the input synchronization signal; and an output part configured to output the image data as the data signal in synchronization with the output synchronization signal.

8. The driving controller of claim 4, wherein the driving frequency controller comprises:

a still image determination part configured to determine whether the image signal is a still image;

a flicker determination part configured to determine a flicker index of the image signal based on determination by the still image determination part that the image signal is the still image; and a frequency determination part configured to determine the driving frequency based on the flicker index.

9. The driving controller of claim 8, wherein the frequency determination part determines the driving frequency to be lower than the frequency of the input synchronization signal based on the image signal being the still image and the flicker index of the image signal being smaller than or equal to a predetermined value.

10. A driving controller comprising:

a driving frequency controller configured to receive an image signal, determine a driving frequency based on the image signal, and output a masking enable signal corresponding to the driving frequency; and an image processor configured to convert the image signal into a data signal and output the data signal, wherein the image processor sequentially converts a part of bits of the image signal into the data signal corresponding to a plurality of dither patterns based on the masking enable signal being at an active level, and wherein the masking enable signal is maintained at the active level based on a frequency of an input synchronization signal matching the driving frequency.

11. A display device comprising:

a display panel including a plurality of pixels respectively connected to a plurality of data lines and a plurality of scan lines;

a data driving circuit configured to drive the plurality of data lines;

a scan driving circuit configured to drive the plurality of scan lines; and a driving controller configured to receive an input synchronization signal and an image signal, and control the data driving circuit and the scan driving circuit, wherein the driving controller comprises:

a driving frequency controller configured to determine a driving frequency of the display panel based on the image signal and output a masking enable signal corresponding to the driving frequency; and an image processor configured to convert the image signal into a data signal and output the data signal, wherein the image processor sequentially converts, based on the masking enable signal being at an active level, a part of bits of the image signal into the data signal corresponding to a plurality of dither patterns, and wherein a frequency of the masking enable signal corresponds to the driving frequency based on the driving frequency mismatching a frequency of the input synchronization signal.

12. The display device of claim 11, wherein the image processor converts, in synchronization with the input synchronization signal based on the masking enable signal being at the active level, the part of bits of the image signal into the data signal corresponding to the plurality of dither patterns of a predetermined order.

13. The display device of claim 11, wherein the driving controller further comprises a control signal generator configured to receive the input synchronization signal and output an output synchronization signal corresponding to the driving frequency.

14. The display device of claim 13, wherein the image processor comprises:

a dithering part configured to output image data by sequentially changing the part of bits of the image signal to the plurality of dither patterns in synchronization with the input synchronization signal; and an output part configured to output the image data as the data signal in synchronization with the output synchronization signal.

15. The display device of claim 13, wherein
the masking enable signal periodically transitions between the active level and an inactive level based on the driving frequency being lower than the frequency of the input synchronization signal, and
a frequency of the masking enable signal corresponds to the driving frequency.

16. The display device of claim 13, wherein the image processor comprises:
a spot correction part configured to output image data by sequentially changing the part of bits of the image signal to a plurality of spot correction patterns in synchronization with the input synchronization signal; and
an output part configured to output the image data as the data signal in synchronization with the output synchronization signal.

17. The display device of claim 13, wherein
the display panel comprises a first display region and a second display region,
the driving frequency controller determines, based on the image signal, a first driving frequency corresponding to the first display region and a second driving frequency corresponding to the second display region, and outputs a first masking enable signal corresponding to the first driving frequency and a second masking enable signal corresponding to the second driving frequency, and
the image processor sequentially converts a first part of bits of a first image signal corresponding to the first display region of the image signal into a first data signal corresponding to a first plurality of dither patterns in synchronization with the input synchronization signal based on the first masking enable signal being at the active level, sequentially converts a second part of bits of a second image signal corresponding to the second display region of the image signal into a second data signal corresponding to a second plurality of dither patterns in synchronization with the input synchronization signal based on the second masking enable signal being at the active level, and outputs the first data signal and the second data signal as the data signal.

18. The display device of claim 17, wherein the first driving frequency is the same as the frequency of the input synchronization signal, and the second driving frequency is lower than the frequency of the input synchronization signal.

19. The display device of claim 18, wherein the image processor converts, in synchronization with the input synchronization signal based on the first masking enable signal being at the active level, the first part of bits of the first image signal into the first data signal corresponding to the first plurality of dither patterns of a first predetermined order.

20. The display device of claim 18, wherein
the image processor converts, in synchronization with the input synchronization signal based on the second masking enable signal being at the active level, the second part of bits of the second image signal into the second data signal corresponding to the second plurality of dither patterns of a second predetermined order, and
the image processor holds converting the second image signal into the second data signal based on the second masking enable signal being at an inactive level.

21. The display device of claim 18, wherein the image processor converts the second image signal into the second data signal corresponding to the second plurality of dither patterns of a second predetermined order based on the second masking enable signal being at an inactive level.

* * * * *